United States Patent [19]
Hinderks

[11] Patent Number: 5,031,401
[45] Date of Patent: Jul. 16, 1991

[54] MEANS FOR TREATMENT OF THE EXHAUST GASES OF COMBUSTION

[76] Inventor: Mitja V. Hinderks, 15a Adamson Road, London N.W.3, England

[21] Appl. No.: 131,231

[22] Filed: Dec. 7, 1987

Related U.S. Application Data

[63] Continuation of Ser. No. 782,190, Sep. 30, 1985, abandoned, which is a continuation of Ser. No. 701,669, Feb. 15, 1985, abandoned, which is a continuation of Ser. No. 592,758, Mar. 26, 1984, abandoned, which is a continuation of Ser. No. 492,151, May 6, 1983, abandoned, which is a continuation of Ser. No. 737,099, Oct. 29, 1976, abandoned, which is a continuation of Ser. No. 473,797, May 28, 1974, abandoned, which is a continuation-in-part of Ser. No. 270,029, Jul. 10, 1972.

[30] Foreign Application Priority Data

Jul. 8, 1971 [GB] United Kingdom ............... 32228
Apr. 10, 1972 [GB] United Kingdom ............... 16450
May 5, 1972 [GB] United Kingdom ............... 21149
May 18, 1972 [GB] United Kingdom ............... 23485

[51] Int. Cl.[5] ............................................. F01N 3/28
[52] U.S. Cl. ................................. 60/302; 60/282; 60/323
[58] Field of Search .................... 60/282, 302, 323

[56] References Cited

U.S. PATENT DOCUMENTS

| 3,043,905 | 7/1962 | Sturtz | 60/302 |
| 3,247,666 | 4/1966 | Behrens | 60/302 |
| 3,302,394 | 2/1967 | Pahnke | 60/302 |
| 3,577,727 | 5/1971 | Warren | 60/282 |
| 3,888,081 | 6/1975 | Fitts | 60/323 |
| 3,918,258 | 11/1975 | Gaschler | 60/282 |
| 3,983,696 | 10/1976 | Pflugfelder | 60/282 |

FOREIGN PATENT DOCUMENTS 1266504 3/1972 United Kingdom ............... 60/302

Primary Examiner—Douglas Hart
Attorney, Agent, or Firm—Stevens, Davis, Miller & Mosher

[57] ABSTRACT

The invention relates to a thermally, and optionally catalytically, operative exhaust gas treatment reactor of an engine, comprising filamentary material directly against and inside the heat insulating portion of a housing assembly which is placed on an engine over the exhaust ports, either directly or with a member interposed. Rapid warm up during cold start is achieved by restriction of gas flow, with the optional re-routing of exhaust gas, including routing to a reservoir which may be expansible. Other features include various embodiments of filamentary material, mechanism for accurately regulating exhaust gas recirculation and provision of extra air, the providing a secondary substance such as water/methanol or steam to induction charge to assist in the balancing of exhaust reactions. Treatment of exhaust gas is generally but not specifically to remove certain undesired pollutants from the exhaust gas of vehicles as required in many countries.

53 Claims, 10 Drawing Sheets

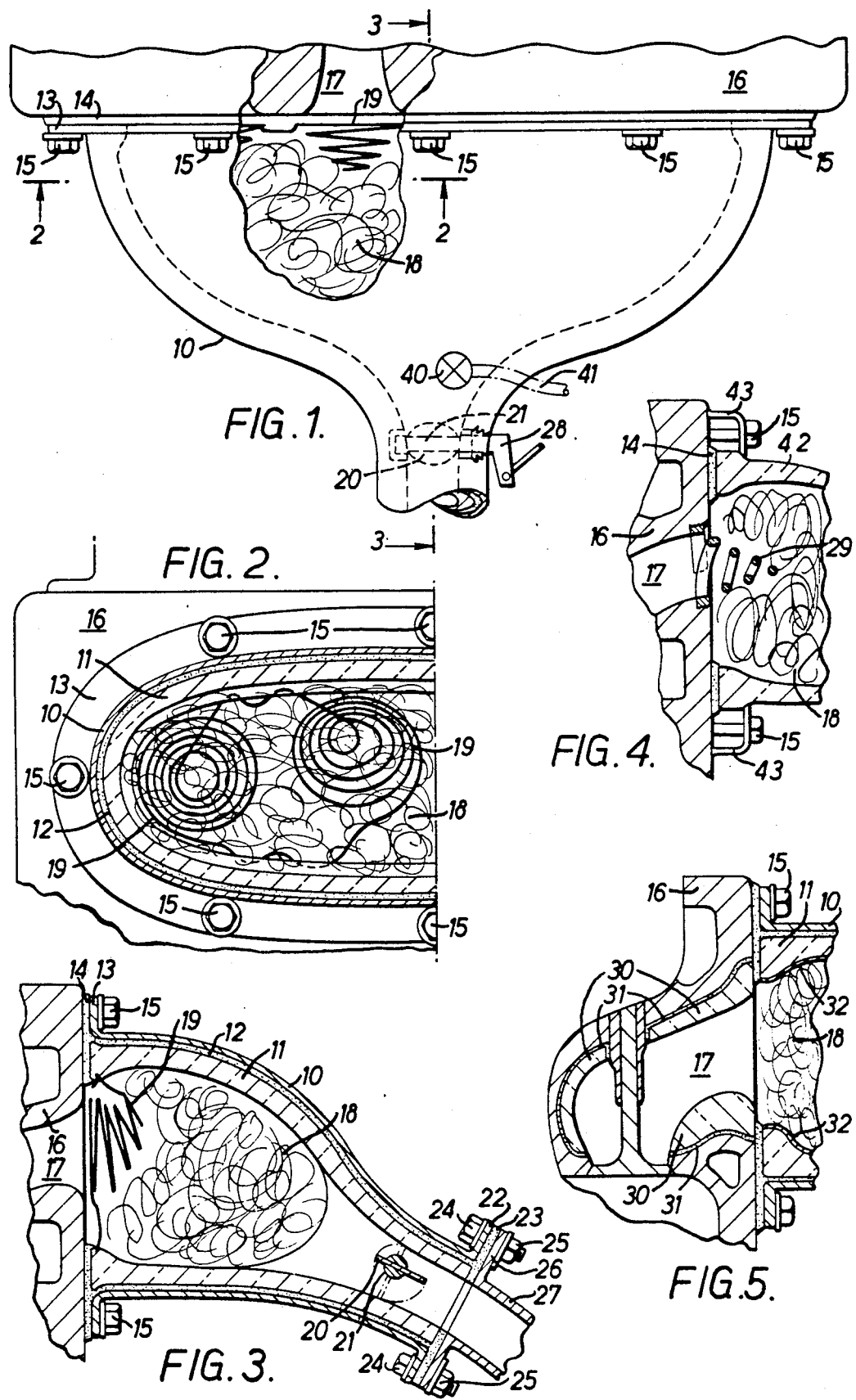

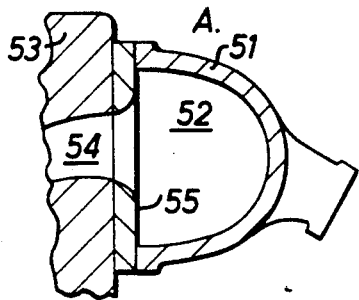
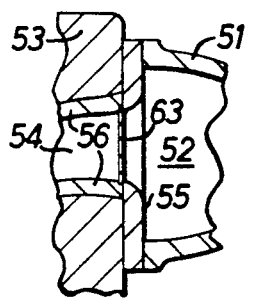
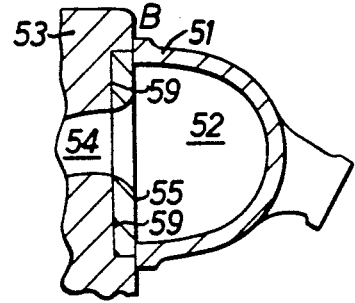
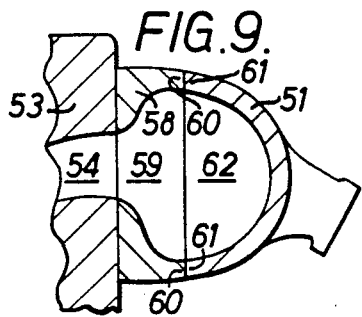
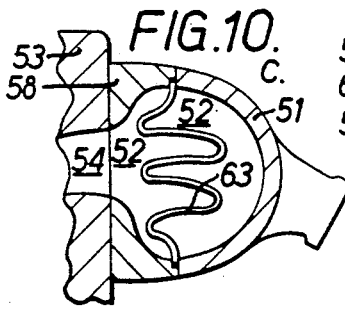
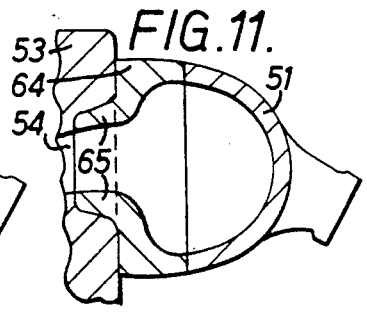
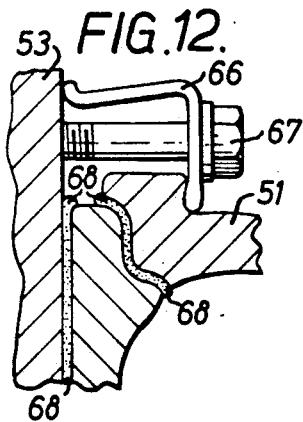
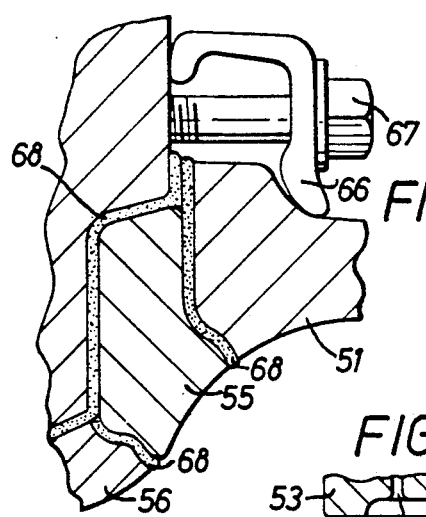
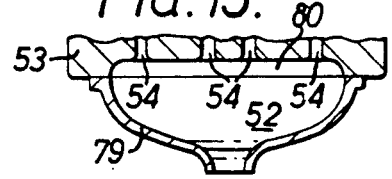
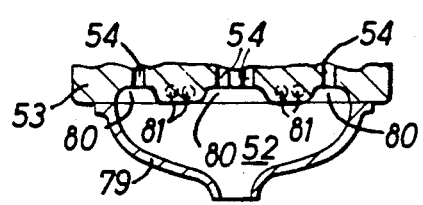
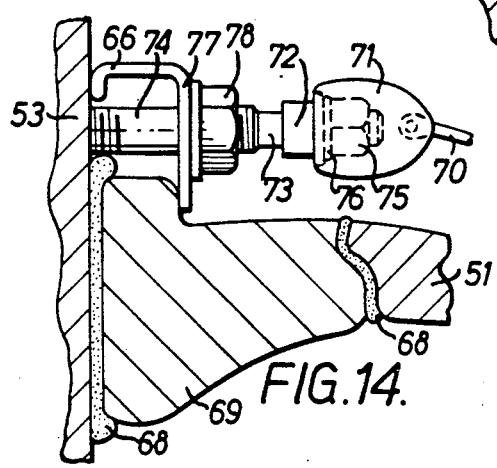

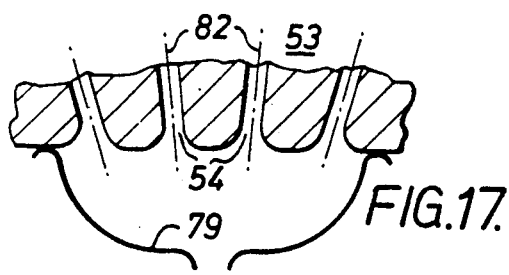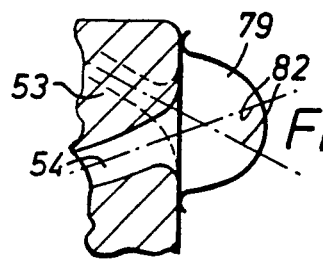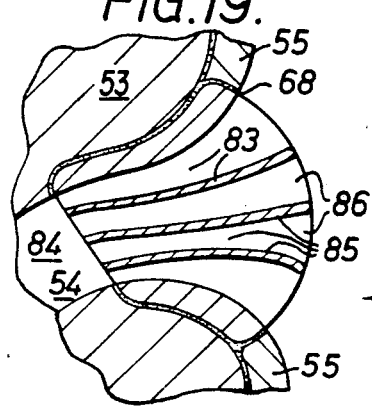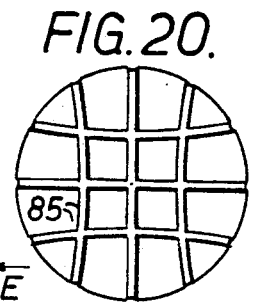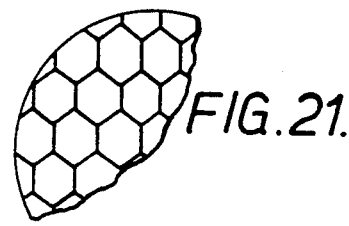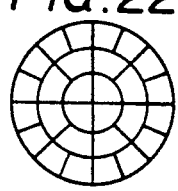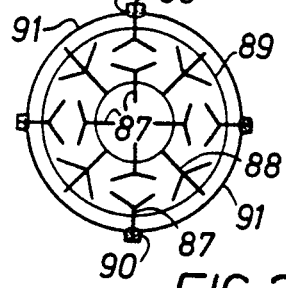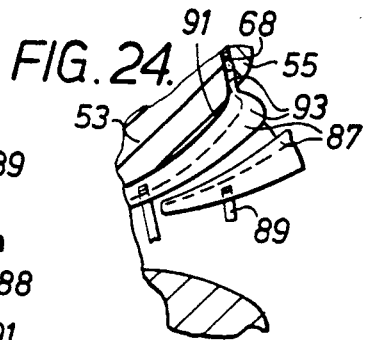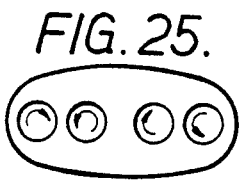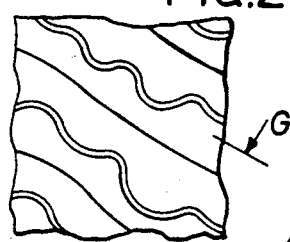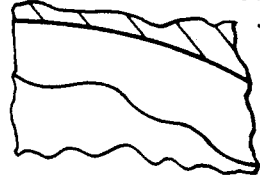

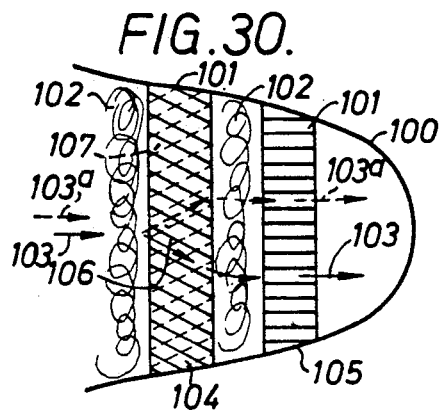
FIG. 30.
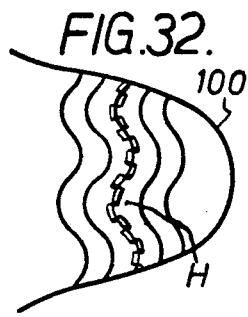
FIG. 32.
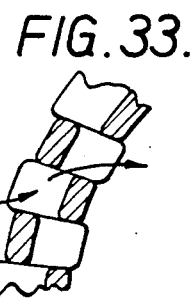
FIG. 33.
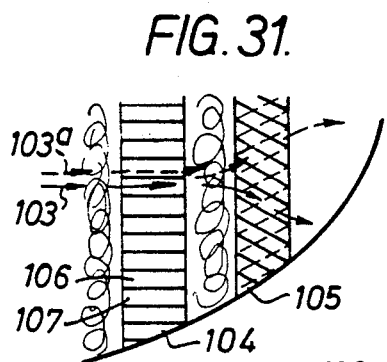
FIG. 31.
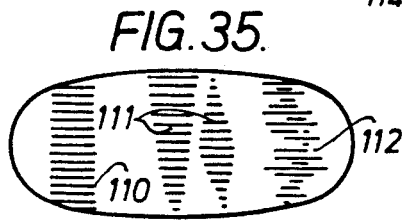
FIG. 35.
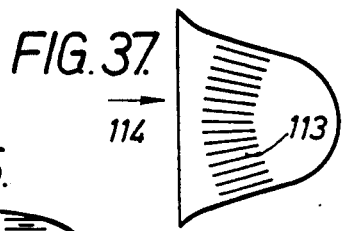
FIG. 37.
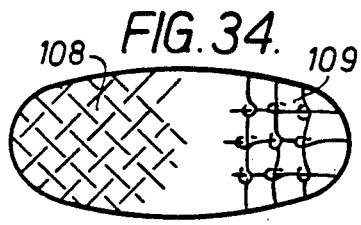
FIG. 34.
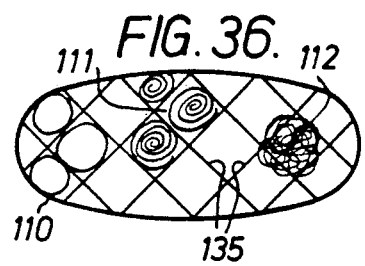
FIG. 36.
FIG. 38.
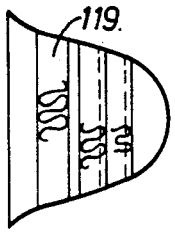
FIG. 42.
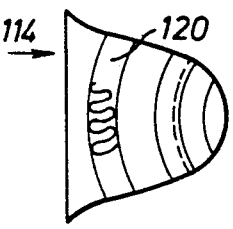
FIG. 43.
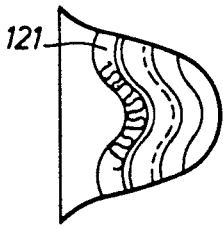
FIG. 44.
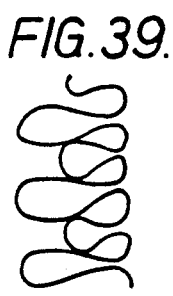
FIG. 39.
FIG. 40.
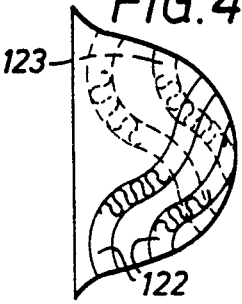
FIG. 45.
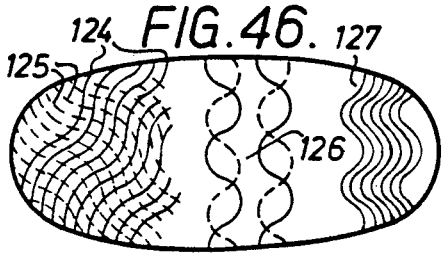
FIG. 46.

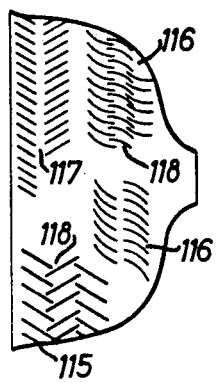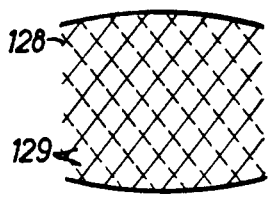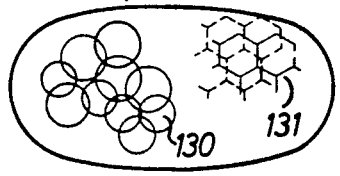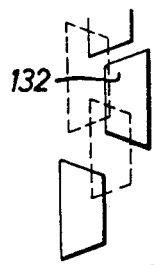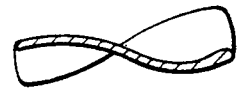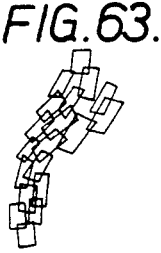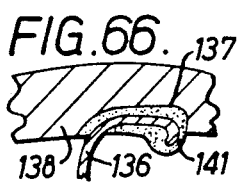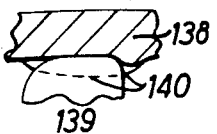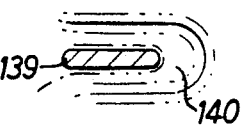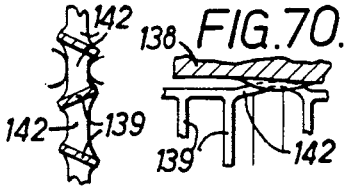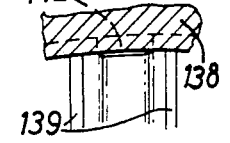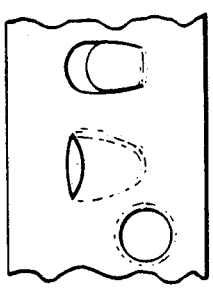

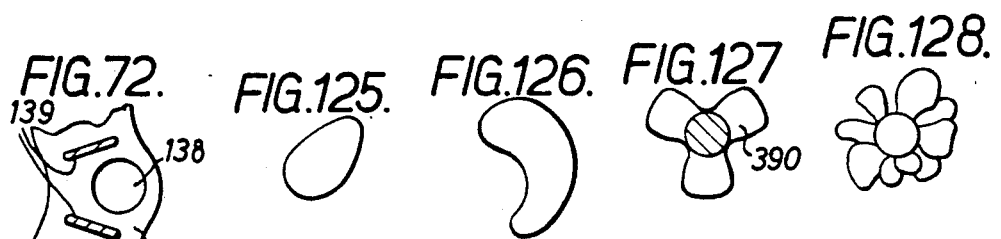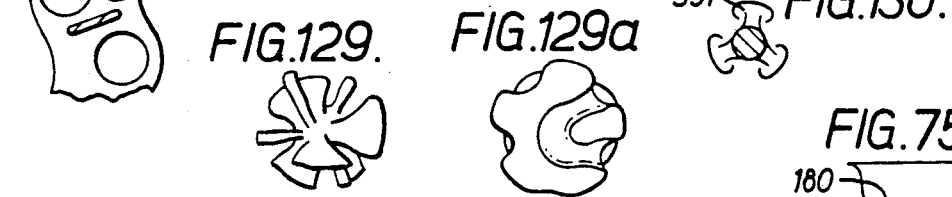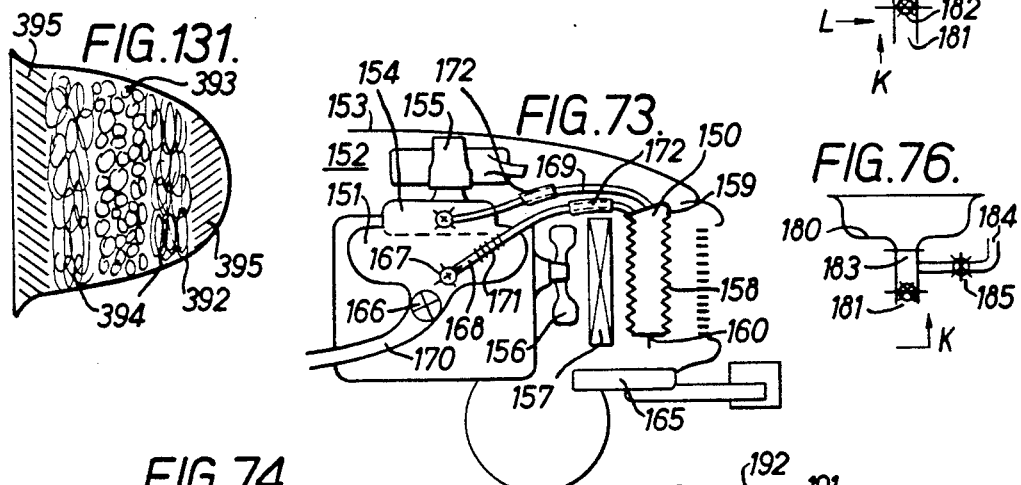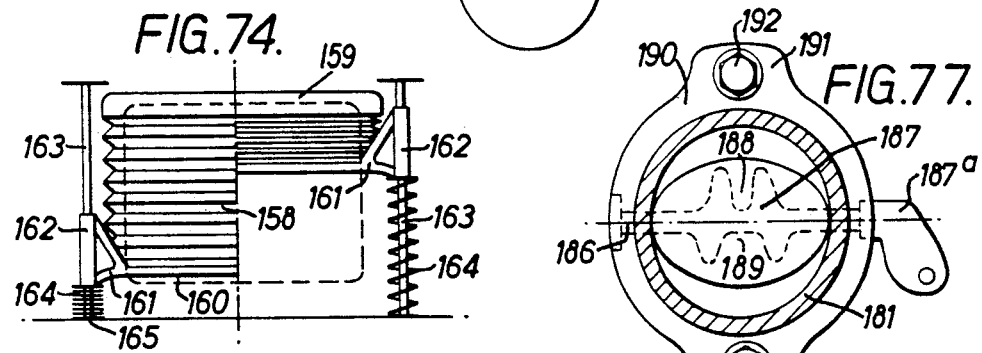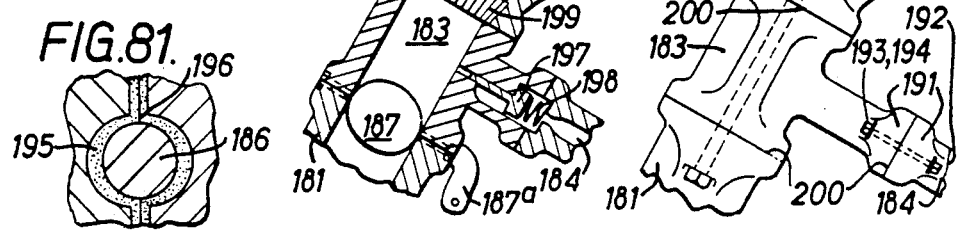

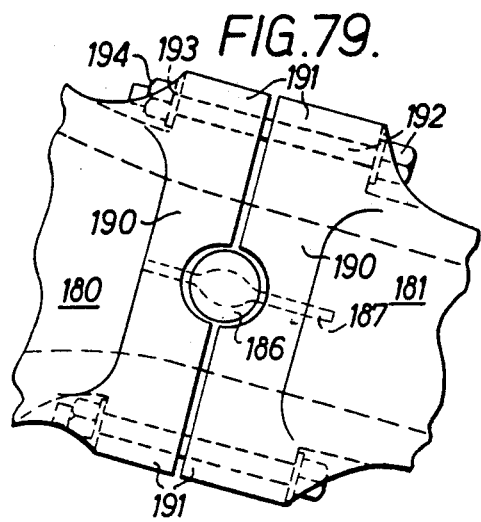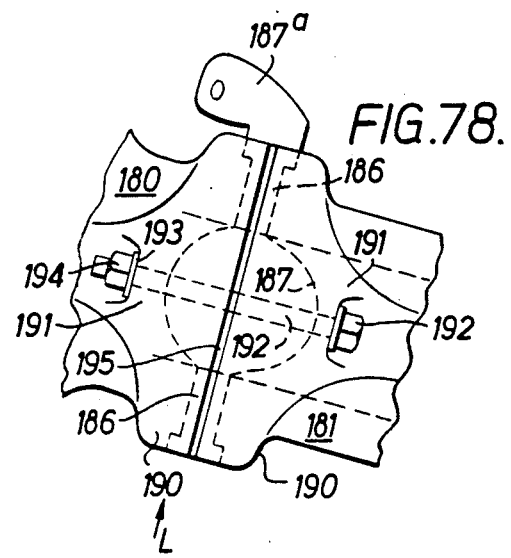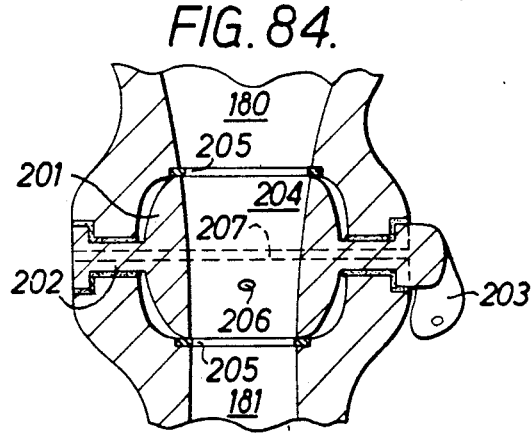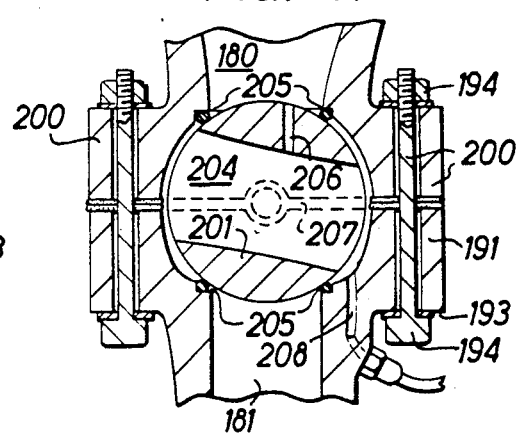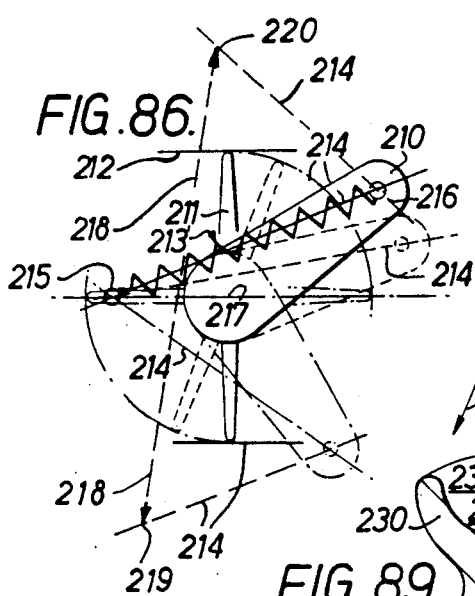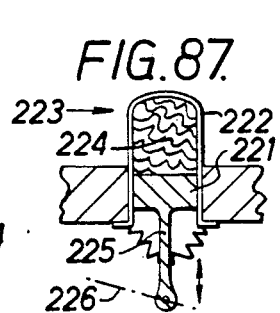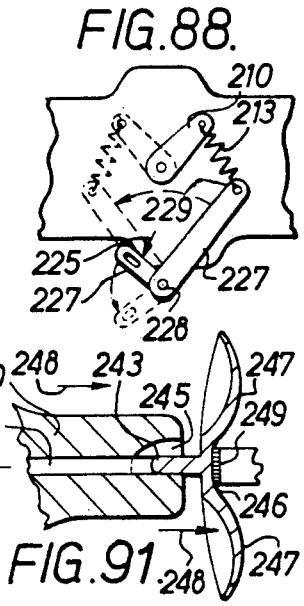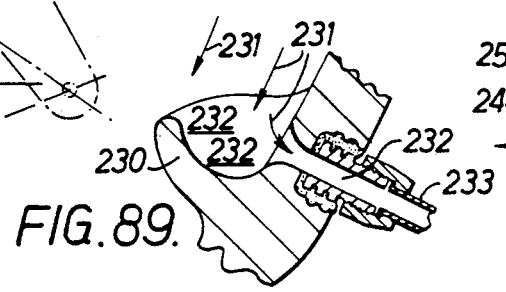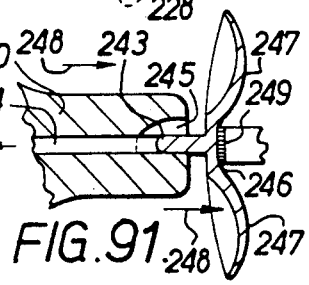

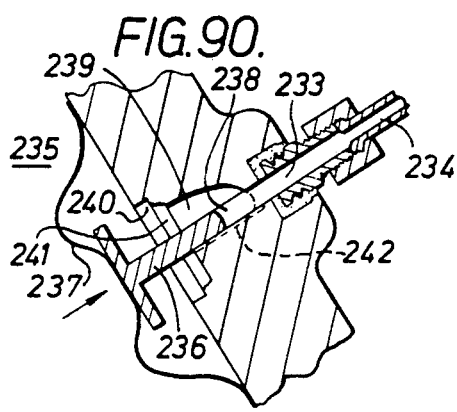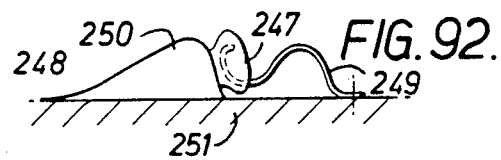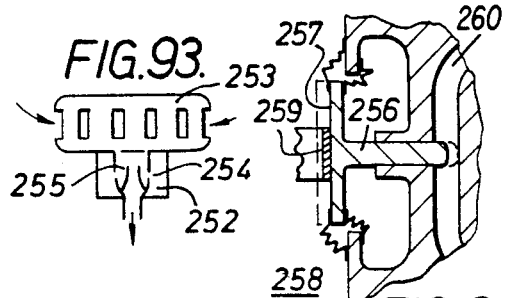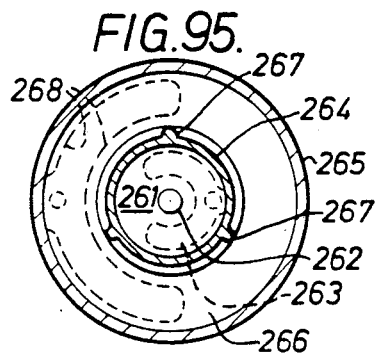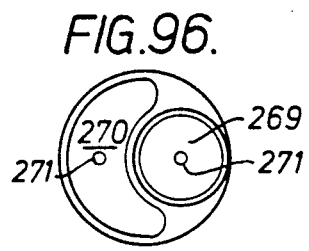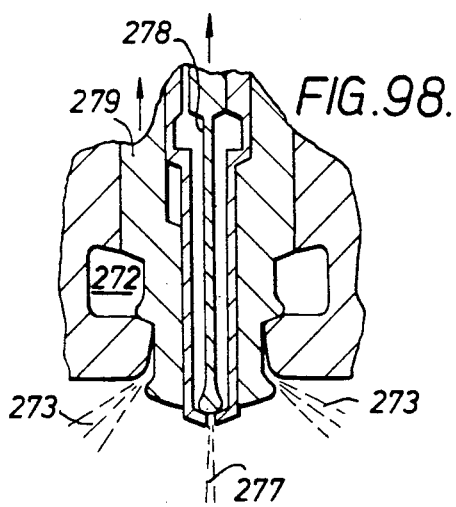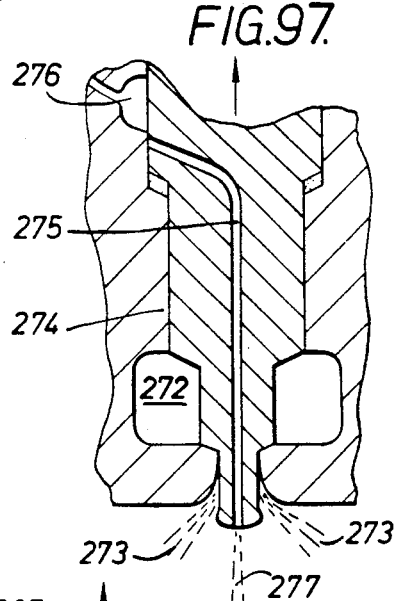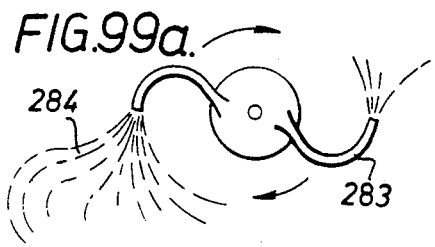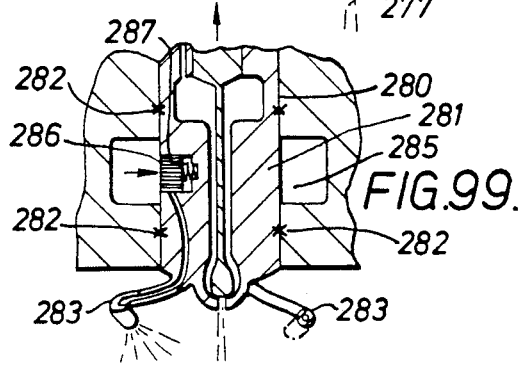

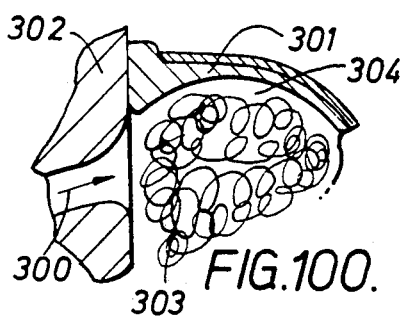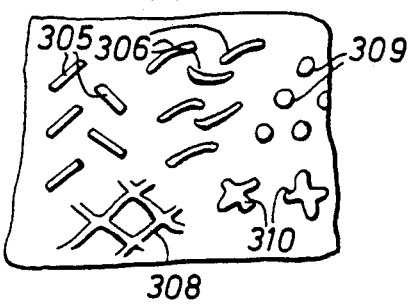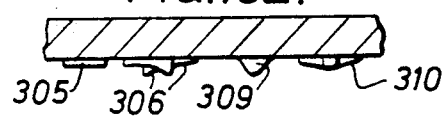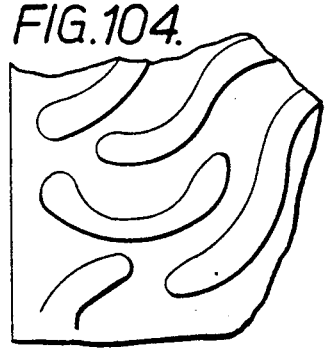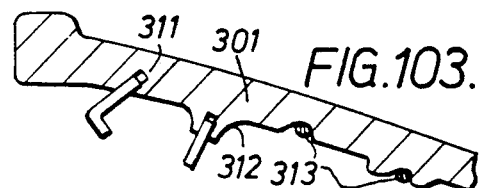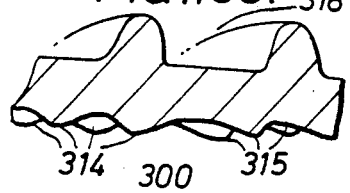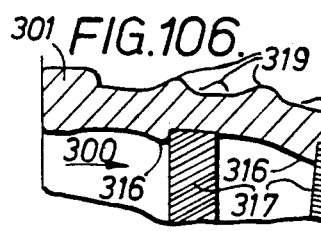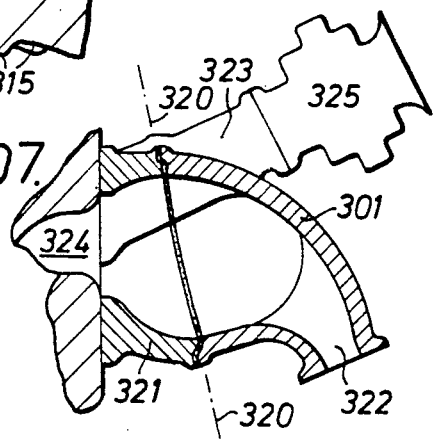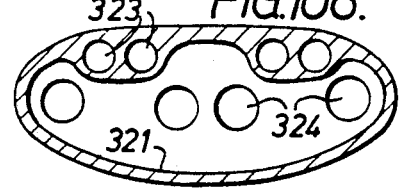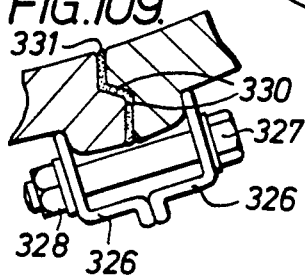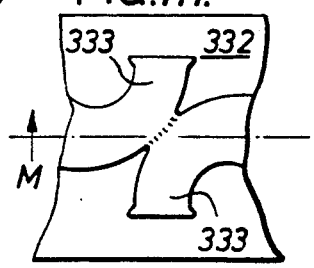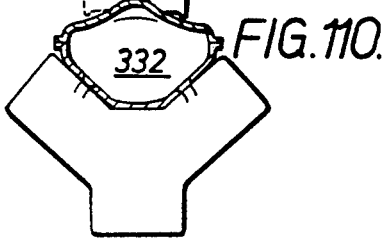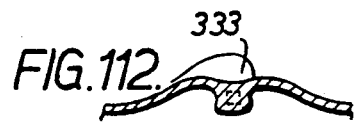

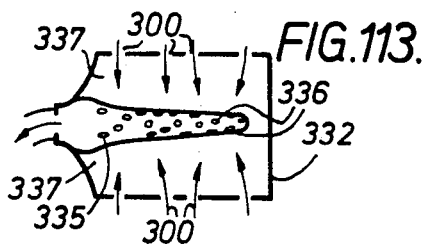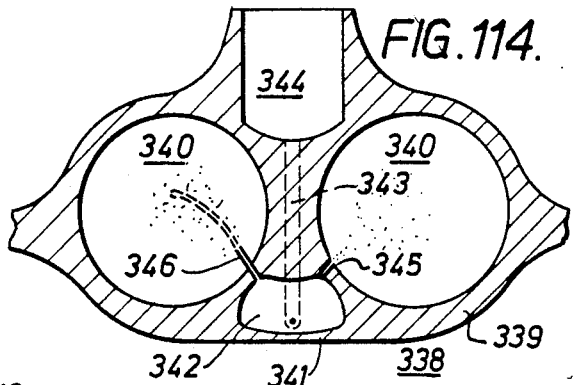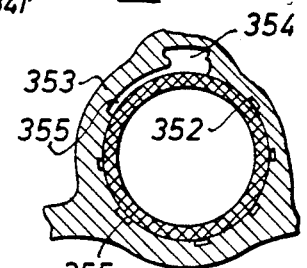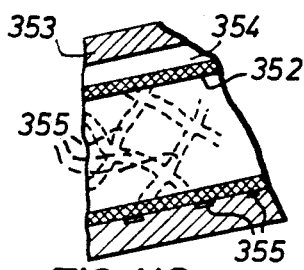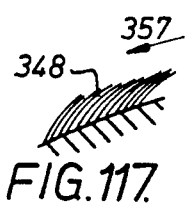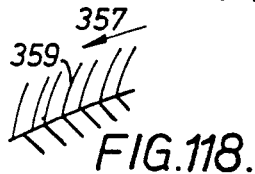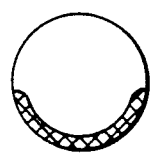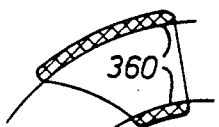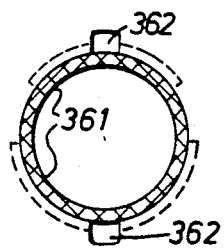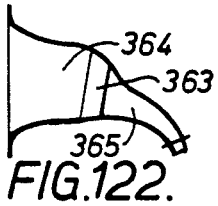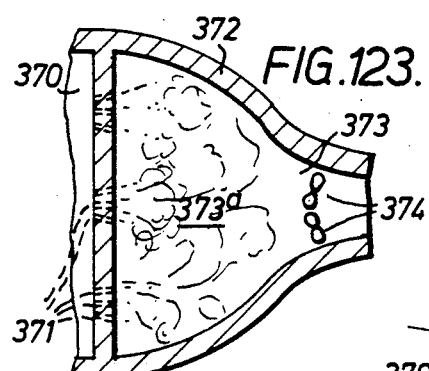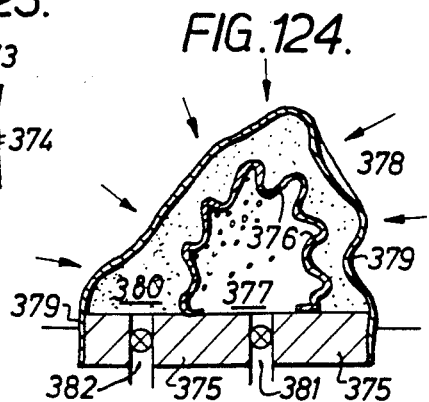

MEANS FOR TREATMENT OF THE EXHAUST GASES OF COMBUSTION

This application is a continuation of U.S. application Ser. No. 782,190 filed Sep. 30 1985, now abandoned, which in turn is a continuation of U.S. application Ser. No. 701,669 filed Feb. 15, 1985, now abandoned, which in turn is a continuation of application Ser. No. 592,758 filed Mar. 26, 1984, now abandoned, which in turn is a continuation of U.S. application Ser. No. 492,151 filed May 6, 1983, now abandoned, which in turn is a continuation of U.S. application Ser. No. 737,099 filed Oct. 29, 1976, now abandoned, which in turn is a continuation of U.S. application Ser. No. 473,797 filed May 28, 1974, now abandoned, which in turn is a continuation-in-part of U.S. application Ser. No. 270,029 filed Jul. 10, 1972, now abandoned.

BACKGROUND OF THE INVENTION

The invention relates to a particular method of purifying the exhaust gases of internal combustion engines, and to the benefits to engine construction, fuel conservation and power output that may arise out of the employment of these methods.

Because of the complexity of both the art and the scope of the method of exhaust emission control described, it is proposed to present this disclosure in several distinct sections comprising filamentary material, cold start and related features, reaction process, form of reactor housing, and materials and manufacturing methods generally.

Since all the materials used for any portion of the assembly must have certain features in common, such as heat and shock tolerance, abrasion and corrosion resistance, they have been described under a separate heading and not in relation to individual features, with the exception of certain isolated cases. The brief description of the drawings is continuous, but the discussion has been separated to the relevant sections. The reasons for these arrangements are both to make the location and cross-referencing of information easier and to help the reader to a clearer understanding of the invention.

It is well known that the art of cleaning exhaust gases (as opposed to the art of minimising the formation of pollutants at the point of combustion) is centred around the technique of speeding up chemical reactions normally tending to continue in the exhaust gases at a slow rate, and that this speeding of chemical reaction is achieved by some combination of two basic means, namely the provision of catalytic agents and the encouragement of reaction under conditions of heat and/or pressure. The provision of extra air is often used to balance properly the chemical reaction to a desired configuration. These methods all involve a majority of common features, such as the employment of reaction chambers, the use of high temperature materials, such as ceramic, the provision of extra air, etc.

The object of the invention is to provide a means of removing noxious or undesirable elements from the exhaust gases from internal combustion, or other, engines, especially in the case of engines fitted in vehicles. The informed reader will no doubt be sufficiently aware of the general background to the desirability of cleaning exhaust gases and the history and progress of enforcing legislation, so obviating the need to explain these matters in detail here. Any knowledge of the matter must include an appreciation of the difficulties that have been encountered over the years, alluded to above, but were generally caused by the very sudden and great upsurge of activity in the field of emissions treatment, due to the promulgation of legislation initiated by the State of California and later the U.S. Federal Government. The suddenness (and often reluctance) with which the motor industry entered this field resulted in much systemless and unco-ordinated work, in which existing techniques and hardware were adapted to meet requirements rather than design approaches being conceived afresh. It is therefore a further object of the invention to overcome the many difficulties and penalties so far encountered with the current means of treating exhaust gases, which are described in greater detail below. The first generation of exhaust emission devices are being fitted to vehicles, for despite their disadvantages the emission laws must be met. It is felt that the present invention constitutes a very much improved second generation approach to the treatment of exhaust gases, for reasons explained in the disclosure.

In general, the problems of early emission systems may be classified under the following five headings, of which the last is perhaps the most important: Adaptability to be mounted on existing engines, ability to meet emission requirements whilst remaining durable, flexibility of design, cost of installation and maintenance, and cost of operating the engine and therefore the vehicle in which it might be installed. Considering first the question of adaptability to be mounted on existing engines, the known systems which offer the promise of good performance are all either very elaborate, involving the use of usually two separate reactors, air pump, exhaust gas recirculation (EGR) sensors, by-pass systems, etc., or they involve different engine configurations or design, as for example rotary, diesel and stratified charge engines. Under the latter circumstances, it is considered unreasonably expensive in terms of cost and effort to change the entire engine system, whilst the question of adapting an existing engine by fitment of existing technology involves such an increased volume of components that the adaption can rarely be made without extensive body and layout modifications. The cost of installing the complex equipment outside assembly-line situations would be very great. As will be seen, the present invention effectively eliminates the need for ancilliary equipment (if some is needed for the highest emission standards, a small sacrifice of performance would presumably prove acceptable for existing vehicles). In addition it is a simple device occuping no additional under-bonnet space, being substitutable for the existing exhaust manifold in a quick and inexpensive operation.

Making all vehicles sold or manufactured in a country conform to a common emissions requirement has generally been a slow and costly procedure. The present invention by its simplicity reduces the variables in practice to the one basic question of type and nature of core configuration. The housing involves no major problems or need for experimentation, and in use it is intended that common housings be adapted to differing engines of similar size or capacity, with core composition modified for the respective engines. Alternatively, a vehicle with the invention fitted could when exported be adapted for the requirements for different countries by substitution of core, without any modification to underbonnet or body layout.

The applicant feels that in the long term all emission treatment means will be thermally operative, rather than almost wholly catalytic as the majority of systems today, and this for reasons connected with hardware costs. Basically both heat or catalysts have been employed to achieve the same effect, that is to hasten reaction process. Catalysts are expensive to produce, need costly replacement or maintenance, while heat is available at no cost, since it has already been produced by the process of internal combustion. Therefore economic pressures will ensure that eventually gas treatment largely employs this readily available heat, and the consequent reduced cost of clean air will make its enforcement practical in areas of the world where it is today considered an uneconomic luxury. To properly use this heat, and thereby reduce ultimate cost, has been one of the prime objects of this invention. In addition to providing a system wherein catalysts have reduced power (and therefore cost), the invention allows for further economy of installation and maintenance in a number of ways. The present invention comprises a single reactor, operative in the tri-component mode, with further cost savings. Some embodiments involve the use of a single integral housing of high alumina ceramic, which can be manufactured relatively cheaply.

It is hoped that this background note, together with the detailed description which follows will enable the reader to understand fully the objects and advantages of the invention.

SUMMARY OF INVENTION

The invention comprises an exhaust gas treatment reactor assembly comprising a housing enclosing reaction volume suitable for the passage of exhaust gas, said volume being partly occupied by filamentary material, said housing comprising at least heat insulating material, said insulating material being disposed in the housing most inwardly. The invention further comprises an engine having an inlet system and exhaust port, said port communicating with exhaust gas treatment reactor assembly comprising a housing partly defining a reaction volume, said housing needing to be affixed to the engine in order to suitably enclose said volume and thereby render capable of operation the reactor assembly, wherein an intermember is disposed between said housing and said engine. The invention further comprises an exhaust gas treatment reactor assembly at least partly comprising a casing having a periferal wall of elliptical configuration in cross-section, the wall of said casing, in plan view, having curved sides gradually narrowing to a blunt apex which forms the exhaust gas discharge aperture. The invention further comprises an engine having an inlet system, an exhaust port, and an exhaust system, said exhaust system communicating with an exhaust gas treatment reactor assembly having gas entry and gas exit, the foregoing components being so arranged that when the engine is operative exhaust gas will pass in a substantially unidirectional manner from a point within said exhaust port to a point beyond said reactor gas exit. The invention further comprises filamentary material suitable for placement in an exhaust gas treatment reactor, said material comprising a multiplicity of pellets, at least one of said pellets having approximately spherical outline and consisting in a series of members substantially projecting from a core. The invention further comprises filamentary material suitable for placement in an exhaust gas treatment reactor, said material comprising a multiplicity of pellets, at least one of said pellets having a surface of approximately spherical outline, said surface to have at least one substantial depression. The invention further comprises an engine having inlet system, exhaust system and when operative exhaust gas flow, said exhaust system communicating with an exhaust gas treatment reactor having gas entry and gas exit, said reactor being effectively warmed on cold engine start by means inhibiting said exhaust gas flow, wherein the said exhaust gas flow is at least partly divertable from normal flow down said exhaust system to an exhaust gas recirculation system, wherein said exhaust gas recirculation system communicates with an exhaust gas reservoir.

BRIEF DESCRIPTION OF THE DRAWINGS

A basic embodiment of the principles of the invention in the form of an exhaust gas thermal/catalytic reactor is described below, together with a description of the mode of the operation of the reactor.

In the accompanying drawings:

FIG. 1 is a diagrammatic plan view, with a portion removed to show the interior of a reactor assembly according to the present invention.

FIG. 2 is a cross-sectional view taken on the line 2—2 of FIG. 1.

FIG. 3 is a cross sectional view taken on the line 3—3 of FIG. 1.

FIG. 4 is a cross sectional view, similar to FIG. 3, but showing a modified construction.

FIG. 5 is a cross sectional view, also similar to FIG. 3, but showing a further modified construction.

FIGS. 6–11 show diagramatically in vertical cross-section various arrangements of intermembers.

FIGS. 12–14 show in cross-section various fixing details.

FIGS. 15 and 16 show diagramatically in sectional plan view two examples wherein reaction volume projects into space normally occupied by the engine.

FIGS. 17 and 18 show arrangements of exhaust port axes.

FIGS. 19–24 describe means of directing exhaust gas flow.

FIGS. 25–28 describe means of imparting swirl to exhaust gases.

FIG. 29 illustrates a preferred embodiment.

FIGS. 30 and 31 describe honeycomb and wool construction.

FIGS. 32 and 33 describe expanded metal or metal mesh construction.

FIG. 34 describes woven and knitted wire.

FIGS. 35–37 describe wire spiral construction.

FIGS. 38–46 describe wire looped construction.

FIGS. 47–51 describe wire strand and associated features.

FIGS. 52–60 describe various slab-like sheet configurations.

FIGS. 61–65 describe sheet used in three dimensional forms.

FIGS. 66–72 describe details of fixing filamentary matter to reactor housing.

FIGS. 73 and 74 show an embodiment of exhaust gas reservoir.

FIGS. 75 and 76 show diagramatically valve, gas routing and component arrangement.

FIGS. 77–81 show an embodiment of butterfly valve in the situation of FIG. 75.

FIGS. 82 and 83 show an embodiment of butterfly valve in the situation of FIG. 76.

FIGS. 84 and 85 show an embodiment of ball valve in the situation of FIG. 76.

FIGS. 86-88 describe examples of valve actuating means.

FIGS. 89-94 describe means of controlling exhaust gas recirculation (EGR) and air supply.

FIGS. 95 and 96 show embodiments of reservoirs containing multiple substances.

FIGS. 97 to 99a show embodiments of composite injectors supplying multiple substances to the combustion volume.

FIG. 100 illustrates the principle of reduced resistance to gas flow adjacent reactor housing.

FIGS. 101-106 describe configurations of reactor wall construction embodying depressions or projections.

FIGS. 107 and 108 show a reactor housing and inlet housing assembly, constituting an integral assembly.

FIG. 109 shows a component fixing detail.

FIGS. 110-113 show form of reactor housing suitable to V-configuration engines.

FIGS. 114-121 describe means of heat treatment of substances, such as fuel, involved in combustion process.

FIG. 122 shows a reactor divided into sections.

FIG. 123 shows diagramatically a way of manufacturing fibres.

FIG. 124 shows an isostactive pressing means.

FIGS. 125-131 illustrate pellet-like filamentary material.

DESCRIPTION OF THE PREFERRED EMBODIMENTS

In carrying the invention into effect as shown by way of example in FIGS. 1 to 3, the reactor assembly comprises an outer metal casing or chamber 10, an inner casing or chamber 11 of solid ceramic material conforming in shape to the inner surface of the outer casing 10 and a layer of fibrous material 12 interposed between the inner and outer casings. The periphery of both the outer casing 10 and layer of fibrous material 12 are provided, respectively, with flanges 13, 14 having a plurality of aligned apertures through which bolts 15 pass to mount the reactor assembly on an engine block 16 so that all the exhaust ports 17 of the block communicate with the interior of the inner ceramic casing 11. Filamentary material such as nickel chrome alloy is accommodated in the inner casing 11 in two forms i.e. firstly randomly disposed wire 18 and secondly a spiral coil 19 of thicker wire mounted adjacent each exhaust port 17 in order to reduce the velocity of the exhaust gases at the port outlet. It will be useful here to summarize the working principles of the reactor prior to the full description following later in this section. In operation, due to the positioning of the reactor on the engine and the insulation of the inner surface, the contents of the chamber, i.e. gases and filamentary material, are maintained at a high temperature, so that the exhaust gases discharged from the engine cylinders continue to oxidise and react after entering the ceramic casing 11, thus substantially eliminating unburned hydro-carbons, carbon monoxide, and the oxides of nitrogen of the exhaust gases. In addition, the filamentary material 18 acts as a filter to trap any solid particles in the exhaust gas and induces localised turbulence which pushes the maximum quantity of gas into contact with the hot surfaces of the filamentary material in the shortest possible time.

In order to ensure rapid warm-up of the filamentary material 18 and 19 during cold starting, a valve member 20 is pivotally mounted on a spindle 21 adjacent the discharge end of the reactor assembly, the metal casing 10 and layer of fibrous material 12 of which are provided, respectively, with flanges 22 and 23 which, as shown in FIG. 3, are connected by bolts 24 and retaining nuts 25 to the flange 26 of an exhaust pipe 27 forming part of the exhaust system of the vehicle. Under cold starting conditions, the valve 20 is closed either manually or automatically (generally two or three cycles after firing commences) by linkage 28 so that the newly fired exhaust gases are retained in the chamber 11 to ensure a rapid temperature rise therein until a predetermined pressure is reached, whereupon the valve member 20 is opened, at least partially. Conveniently, this may be effected by having the valve 20 biased to a closed position by a torsion spring (not shown), operative only during the cold start procedure, and mounted on a spindle 21 which is diametrically displaced so that the increasing pressure in the reactor assembly applies a turning moment to the valve member 20 which commences to open when the moment exceeds the closing force exerted by the spring. A pressure relief valve 40 and passage 41, shown diagramatically in FIG. 1, may be provided in the chamber anterior to the valve member 20.

It will therefore be appreciated that the normal position of the valve at the discharge end of the reactor retains the exhaust gases in the chamber with a consequent rapid rise in the temperature of the filamentary material which in turn assists in the continued reaction of the trapped gases. A similar, although less intensive, effect is achieved by the partial closure of the valve member 20, which by the build up of pressure delays the normal passage of the exhaust gases, which thereby remain longer in contact with the filamentary material and heated surfaces and are encouraged to react, e.g. by oxidation and/or reduction.

The modified arrangement shown in FIG. 4 is suitable for use with, a high performance engine where maximum insulation may not be desired and the firm mounting of filamentary material may be important. In this embodiment one end of the spiral coil 29 which has a thickened externally threaded base is screwed directly in the exhaust port 17 which increases heat transfer from the outgoing exhaust gases to the surrounding block 16 and engine cooling systems. The chamber housing shown partly in section at 42 illustrates an alternative construction comprising integral ceramic shell held in position by 'L' clamps 43 and bolts 15.

In the modification shown in FIG. 5, if it is found necessary to reduce heat transfer from the outgoing exhaust gases to the surrounding block 16 and cooling system, each port 17 is provided with a sleeve 30 of ceramic material which has a layer of fibrous material 31 interposed between its outer surface and the block 16. A skin of metal or other material 32 is shown placed within the insulation in order to assist in the reaction process. In FIG. 5, it is shown diagramatically, but in a preferred embodiment, this skin 22 of metal or other material is of no significant thickness and constitutes a film which has been applied by a deposition process, or a leaf (say of similar configuration to gold leaf) applied by pressure and/or adhesive. The film may further be applied to a say ceramic structure by means of depositing the material in metal powder form on the surface of a mould during the process of manufacturing such ceramic structure. Where this process entails forming under heat and/or pressure, the foreign material will be bonded to the surface of the ceramic, to substantially form a film.

Catalysts may be associated with the reactor assembly to assist in the removal or transformation of the undesirable constituents in the exhaust gases. The embodiment described above relating to metal or other films describes how a catalyst may be associated with the internal surface of the reactor, but to be properly effective the catalyst should be present throughout the chamber, so that all the gases may be exposed to catalytic action. Catalysts may be incorporated in or with the filamentary material disposed within the chamber. By catalyst is often meant materials with very strong catalytic action such as noble metals like platinum, palladium, etc., However, in this disclosure catalyst is meant to be any material having a significant, measurable catalytic effect and thereby is certainly included materials having only moderate catalytic effect, such as nickel, chrome, nickel/chrome alloys, etc., The conventional approach to the provision of catalytic action within exhaust reactor systems involves the placing of strong catalysts such as noble metals in small quantities on a supportive material such as ceramic. In a similar manner, the filamentary material may have deposited on it small quantities of another material having catalytic properties. Alternatively the filamentary material may be constructed of a material which itself has a moderate to good catalytic effect, such as nickel/chrome alloy.

The filamentary material may consist of high temperature metal alloy, such as stainless steel, Iconel, or ceramic or "plastics" material, i.e. materials of the "giant molecule" family, having molecular weights in the over 5,000 range, including such generic materials as polymers, hydro-carbons, resins, silicons, etc., These are more fully described hereinafter. By the term "filamentary material" is meant portions of interconnected material which allow the passage of the gases therethrough and induce turbulence and mixing by changing the directions of travel of portions of the gas relative to each other. Such material conveniently takes the form of random or regularly disposed fibres, strands or wires, but may also take the form of multi-apertured sheet or slab, cast, pressed or stamped three dimensional members having extended surfaces.

The chamber housing may be constructed as already described, i.e. either from solid ceramic or a multiple layered construction comprising an internal skin of ceramic, an interlayer of fibrous material such as ceramic wool, and an external structural casing of metal. Any suitable high temperature material having good structural and/or insulation characteristics may be employed, including materials of the giant molecule family mentioned above. The housing may be of composite construction, e.g. with one layer manufactured inside or outside of another already manufactured layer. In this way, a layer of high temperature resin, having very good insulation qualities but not very resistant to abrasion or corrosion, may be formed outside of a ceramic shell which, because of its hardness and greater temperature tolerance, will be less resistant to attack by the exhaust gases, as more fully described subsequently.

It will be appreciated that, if desired, provision may be made for the entry of additional air into the chamber to assist in the combustion process. As mentioned above, it is felt to be a desirable object to eliminate the need for extra air, and it will be explained later why under normal circumstances the desired reactions may take place without the need for extra air. However, it is envisaged that the invention may be adapted to existing engines or engine designs, and these may sometimes have special combustion characteristics which require extra air, perhaps under some running conditions. Similarly, some engines are purposely built to operate under very special running conditions, for example, to power heavy earth-moving equipment, and for such applications the provision for extra air may be desirable.

In operation, the device described above will act as a thermal/catalytic exhaust gas reactor, that is to say, it is capable of achieving its objective of hastening the process of reaction by the provision of both a high temperature environment and a catalytic action in the same reactor assembly. For reasons which will be more fully explained later, it is the temperature aspect which is in general more important, i.e. more effective, and the catalytic action can be said to be, in some applications, an assistance to the temperature-oriented process. It is possible, with basically very clean engines, to envisage de-polluting the exhaust gases to the highest standards with negligible or coincidental catalytic action. By coincidental is meant that materials having some catalytic effect may be present in contact with the gases for reasons unconnected with catalytic action, that is they may be the most suitable materials to meet certain design parameters, such as high temperature resistance, etc., The principles of the invention will remain largely the same in the many embodiments suitable to be adapted to all internal combustion engines, and will here be described in general without reference to specific data, which will of necessity only apply to a particular engine. Where applicable such data will be given. It will be appreciated that engines have widely differing compression ratios, exhaust gas temperatures, gas flow rates, relationships of power to torque, as well as varying operating modes, but the basic principles of the invention will be applicable to nearly all internal combustion engine configurations.

The invention will constitute a very effective thermal reactor. High working temperatures will be attained because of the proximity to the exhaust ports, which discharge directly into the reaction volume, and its shape which entails a small external surface in relation to volume, so keeping heat loss to a minimum. Conventional thermal reactors, of which perhaps a typical example is described in Behrens U.S. Pat. No. 3,247,666, usually involve a plurality of stub exhaust pipes discharging into a narrow cylinder, and here the surface areas are high in relation to reactor volume, with consequent greater heat loss. The conventional configuration also poses problems with insulation, since the most suitable material, ceramic, cannot readily be made reliably in these relatively complex shapes, cracking occurring where one cylindrical shape meets another. The invention, with its flowing rounded shapes, inherently very strong, is more suited to application of considerable insulation, which can readily be manufactured in the most suitable material. The provision of exhaust port insulation, for example as in FIG. 5. will further eliminate heat losses otherwise carried through the block or cylinder head to the cooling system. Because of the shape of the invention, which can broadly be described as a form of inverted megaphone, and the presence of filamentary material (perhaps of a wool-like configuration) internally, it will act to a significant degree as a muffler. It is known that a muffling effect involves dissipation of sound waves, whose energy is converted to heat which remains residual in the muffling agent. In this manner a significant additional build up of heat will occur in the filamentary material and on the walls of the chamber, due to the dissipation of sound waves and also of physical vibration. The main chemical processes, which will be described later, all involve oxidisation in part of the reactions, and this produces further considerable heat. It is estimated that because of a combination of all or some of the above factors, ambient temperatures in the invention will be higher than at the exhaust port of an untreated engine. Temperatures drop during idle or low-load conditions, and here the invention will be at an advantage over some other systems, in that a relatively thick ceramic shell will act as a heat sink (as do ceramic linings in many industrial processes) and cause some heat to be radiated inwards if the exhaust temperature drops below that of the inside of the housing. This radiation will be directed to maximum advantage because of the rounded or radial cross-sectional form of the housing.

The beneficial effects of the high ambient temperature are most efficiently exploited in the present invention principally through the provision of filamentary material, which, in effect, means exposing the exhaust gas to a multiplicity of hot surfaces. It is known that for some reason, apparently still not fully understood by thermodynamicists, chemical action more readily takes place in the presence of a heated surface. This phenomenon is distinct from catalytic action, which relates to the nature of materials. Therefore the provision of multiple, closely spaced heated surfaces in the form of filamentary material ensures that every portion of the continuously reacting exhaust gases is in close proximity to a heated surface. Further, the exhaust gases are immediately exposed to such surfaces on leaving the port, when they are at their hottest and most ready to react. The filamentary material has the additional advantage of inducing minor turbulence, causing the various portions of the gases to mix properly with each other, thus helping the reaction process and also causing some heat to be generated by the kinetic energy of gas movement. This turbulence is important for another reason in that it allows the composition of the gases more readily to 'average out'. During the process of combustion, different products are formed in the various portions of the cylinder, due to differences in temperature, the variable nature of flame spread, locality of spark plug and fuel entry, presence of fuel or carbon on the cylinder walls, etc. Usually these differing products of combustion are mixed to some degree in their passage through the port, but nevertheless pockets of a particular "non-average" gas may persist, and these will not have the proper composition to interact in the desired way. This can occasionally present difficulties, for instance in the long unconnected capillary passages of the honeycomb structures used for catalysts, if these are mounted too near the exhaust ports. The nature of the filamentary material of the invention ensures that this proper "averaging out" or intermixing of gas composition takes place. Conventional reactors, as for example by Behrens, are in comparison with the invention relatively crude in this respect. Great columns or cylinders of gas flow through the apparatus, which is only affecting a very thin periphery of the gas.

It is intended that the invention incorporates catalytic agents of whatever nature and strength desired, depending on such factors as the efficiency of the thermally assisted reactions, the type and quantity of pollutants that are needed to be removed, durability, the particular additives of the fuel, etc. There has already been described how coatings of catalytic materials may be applied substantially to the various surfaces of the reactor interior. In a preferred embodiment the filamentary material itself is manufactured form material having catalytic effects, such as nickel, nickel/chrome, copper, stainless steel, etc. Nickel/chrome alloy is a most suitable material, since it is not too expensive and is relatively resistant to corrosion, abrasion and high temperatures, having a moderate to good catalytic rating. However, at the high ambient temperatures of the invention, nickel/chrome will have formed on its surface films of nickel chrome oxide, which has a catalytic rating considerably better than that of its base. Such a material, disposed in filamentary form, will have a strong catalytic effect.

Most catalytic activity has involved placing the catalyst relatively far from the exhaust ports where temperatures have been in roughly the 200° to 500° C. range, because the noble metal catalysts, or their method of fixing to base material, or the form of the base material (often honeycomb ceramic) has not been reliable or durable at higher temperatures. It is known that catalytic effectiveness can increase logarithmically with temperature increase, in roughly squared proportion. In other words, doubling the temperature can give around four times the effectiveness, tripling the temperature nine times the effectiveness, etc. Of course, this is an extremely rough guide, there being no such clear cut mathematical progression, much depending on materials and circumstances of reaction. For example, certain catalysts become effective within a relatively small temperature increase and then do not greatly increase effectiveness with further substantial rise in temperature. But in general, catalytic effectiveness increases substantially with increase in temperature, as shown in work of G. L. Bauerle, and K. Nobe (amongst others) in their paper of September 1970 for Project Clean Air, associated with the University of California. The present invention offers scope for using known catalysts more effectively than ever before, since they will operate in temperatures significantly higher than those currently employed in catalytic practice.

The filamentary material, together with the high ambient temperatures, will ensure that the invention will be exceptionally tolerant of particulate matter and impurities or trace materials, such as for example lead compounds. The filamentary material, especially if at least partly of fibrous or wool-like configuration, will to a great extent act as a trap for particulate matter, without the lodging of such matter in the reactor significantly affecting the latter's performance. Certain other systems, such as catalytic honeycomb structures are notoriously sensitive to particulate clogging, damage by impurities originating in the fuel or by operator misuse. The vast majority of any particulate matter lodging in the present reactor system, with its exceptionally high ambient temperatures, would decompose, oxidise or otherwise react, especially if deposited on surfaces having catalytic characteristics. As with catalytic effectiveness, substances generally increase their tendency to react or combine in logarithmic proportion to temperature increase, in other words a substance will roughly react four times as easily if temperature is doubled. Of course, the provisos mentioned above apply, but, this very broad principle can be said to be the theory behind thermal reactors in general. It is for this reason also that the invention is considered to be primarily a thermally operative reactor, the manner and effects of this thermal action being described above. Although it may also operate very effectively in the catalytic mode, this operation is enhanced and affected by the high working temperatures attainable within the assembly.

Both in its thermal and catalytic operating modes—which in practice merge to form a homogenous encouragement for matter to combine—the reactor is intended to function in the tricomponent or three constituent mode, that is the three principal pollutants are all reduced during their passage through the single device. The three main pollutants are hydrocarbons (HC), carbon monoxide (CO) and oxides of nitrogen NOx. Industry in the three constituent approach has only developed significantly since the early seventies, and first mention of successful laboratory results were apparently in a paper presented by T. V. de Palma at the Interpetrol Congress in Rome, Italy, on the 24 Jun. 1971. This and subsequent efforts have all used catalysts of the conventional configuration (although not necessarily material). By an extraordinary coincidence, calculations and practical results have shown that the three constituents are most likely to be simultaneously reduced at fuel/air mixture ratios of 14.7 to 1, in other words at stoichiometric mixtures, those producing the optimum overall power or work from the combustion of a given amount of fuel. The practical and commercial significance of this is mentioned above, but can be summarised as meaning that no modifications to the combustion process nor, no additions to the exhaust reaction process, need be made. This means that virtually all such power-sapping and/or expensive devices such as extra air, exhaust gas recirculation, ignition timing alterations from optimum, enriching or weakening the mixture, etc., could be eliminated if the tricomponent approach to exhaust gas treatment is successfully employed. Briefly and very simply explained, the tricomponent process functions in the following manner: Firstly, the hydrocarbons react with oxygen normally present in the exhaust gases, since this is the most readily formed oxidation. Next, the carbon monoxide unites with the remaining oxygen to form carbon dioxide. However, not all the carbon monoxide has been disposed of, approximately half remaining, and this becomes sufficiently 'oxygen hungry' to attack the oxides of nitrogen, transforming itself to carbon dioxide, leaving nitrogen and other compounds.

The first results, although successful under laboratory conditions, were impractical commercially because of the extreme sensitivity of the catalyst and excessive degree of mixture control required. Although mixture control techniques have improved greatly in the intervening period and catalysts have become more tolerant, this is still a basic problem with the pure catalytic approach. The present system offers advantages over prior systems, in that its operation is thermally oriented and it contains filamentary material. The clogging and poisoning of conventional catalysts is no longer a problem, and the invention's tolerance of impurities can be an advantage. The tricomponent process depends on critical adjustment of fuel mixtures; when the mixture becomes unbalanced there arises an excess or lack of one of the constituents and so the reactions do not balance out, leaving pollutants still 'unreacted'. Usually this involves some form of starvation, i.e. there is no material left for a pollutant to react with. The quantities of 'unreacted' pollutants are generally very small, and because of the 'starvation' situation would have a tendency to react with other matter present. Thus, the present invention, which is impurity tolerant and would have disposed within it significant traces of impurities or secondary material, will tend to be more suited to the tricomponent approach than many current systems.

A further very important advantage of the present invention is that it employs the tricomponent approach using primarily thermal means, unlike all other tricomponent systems known to applicant which all employ a substantially catalytic approach. Of the three principal reactions, that between the carbon monoxide and the oxides of nitrogen is the most difficult to achieve. Traditionally, the removal of the NOx has presented greatest difficulty in nearly all emission systems, basically because of the relative reluctance of NOx to react with other substances. This has meant the industry-wide employment of powerful catalysts and was the impetus behind the employment of expensive noble metals such as palladium, etc. This reaction is also the one needing the most assistance in the tricomponent process. However the two chemical types involved here, CO and NOx, change their characteristics markedly with increase in temperature. At the ambient temperatures of the present invention they behave differently than such gases in current catalytic systems, which may be up to 700° C. cooler. The oxides of nitrogen (in fact a family of compounds having broadly similar characteristics) become unstable at high temperature, having the tendency to break into their constituent elements and form new reactions. The carbon monoxide becomes extremely oxygen hungry with increase in temperature and will far more readily form the desired reaction with the less stable NOx. The effect on chemical characteristics and stability is here again roughly in logarithmical proportion to increase in temperature. In other words, it is one of the prime advantages of the invention that the tricomponent process takes place in a high temperature environment. It is felt that this method offers the best long term approach to the treatment of the most difficult pollutant, NOx.

The first attempts to solve the emission problems used a thermal approach, because of its many inherent advantages. Work was gradually abandoned because of the great difficulties of the cold-start situation. To be effective the reactors had to be hot; warm up took a considerable time, during which an unacceptable level of pollutants were emitted.

It was to overcome this traditional problem that the cold-start procedure of the present invention was evolved. A reactor inevitably has a considerable mass, so efforts were made to devise a system whereby at least the effective working parts of the reactor attained the desired temperature, rather than the whole assembly, including parts not affecting the reaction process. The surfaces of the present invention are its effective working parts, and almost wholly comprise the internal lining of the housing, consisting of insulating material, and the internally disposed filamentary matter. The insulating material, such as ceramic, may have a low conductivity and therefore will not significantly transmit heat from the interior of the chamber, nor will it need much heat input to heat the surface molecules to the internal ambiant temperature. (Because of low conductivity, the surface molecules do not readily conduct heat to adjacent more inwardly disposed molecules). It is for this very important reason that the invention has its reaction volume directly enclosed by insulating material. The interior filamentary material essentially has low mass and extended surface area (unlike the heavier baffles or internal chambers of some traditional reactors.) As will be described more fully hereinafter, the filamentary matter may be of a wide range of materials, including for example metals and ceramics. If metals are used, their conductivity ensures that heat will be absorbed in heating their entire mass, whilst in the case of ceramics, for the reasons mentioned in connection with the housing, very little heat would be absorbed in bringing surface temperatures to the required levels. It is important to emphasize that the heated surfaces of the reactor are its effective working parts and that therefore only their surfaces need warm up rapidly.

It is in order to use heat already available from the process of combustion (rather than purposely provided for initial cold start) that the gas exit from the chamber is at least in part closed after firing commences. Calculations have shown that, provided all the newly fired gases can be retained in the chamber, its working surfaces will attain temperatures of 700° C. within between about five and fifty cycles after firing commences, depending on engine type, degree of conductivity of the filamentary material, whether exhaust port insulation is fitted, etc. It has been assumed that the total reaction volume is approximately double the engine capacity and that roughly 500 grams of filamentary material are employed for every two liters engine capacity. At idling speeds of 1,200 r.p.m. a four-stroke engine would have, according to the above, a warm up period of between half a second and five seconds. A contributing factor to the temperature rise is the fact that the gases are maintained under pressure, this pressure soon contributing some load to the pistons, and thereby enabling the engine and especially the combustion volumes to warm up more rapidly.

In a preferred embodiment, the reactor gas exit is closed in cold start by mechanical or automatic means after firing has commenced and just prior to the newly fired exhaust gases reaching the closure means, which in the case of four-stroke engines will be somewhere between two and five cycles after firing commences, depending on reactor volume, etc. This allows the residual gases to be expelled and ensures that all the thermal energy produced by the combustion process and contained in the exhaust gases at the ports is entirely used to heat the working surfaces of the invention, and accounts for its rapid warm up. The newly fired trapped gases are reacting in the desired fashion, but more slowly than they would at normal working temperatures. The fact that they remain much longer in contact with reactor surfaces than they do under normal running high temperature situations compensates for their slow reaction rate and ensures that the first gases are largely pollutant free when they leave the reactor. This feature is of great importance where the invention has been fitted to a vehicle seeking to meet for example U.S. emission regulations, important sections of which are enforced through cold-start tests. The requirements of these tests have not always been easily met by other systems, especially some thermal reactors, but the present invention has the unique advantage of producing zero emissions, in fact no exhaust gas whatever, during cold start. This is a most important feature of great social usefulness.

The minimum number of cycles (i.e. firings) needed to reach reactor operating temperature and the maximum number of cycles which may elapse before the exit need be closed are sufficiently near overlap to ensure that the newly fired exhaust gases can be totally contained (i.e. the closure member be totally closed) for at least a substantial, very possible the whole part of the cold start procedure, depending on such parameters as engine and reactor construction, volume relationships, etc. In a preferred embodiment, the closure member remains wholly closed until a pressure is reached inside the reactor, which is just below that which would cause the engine, which is pumping against reactor pressure, to stall on idling. In use it is preferred that the vehicle be not drivable during the few seconds of the cold start procedure, since pressure below optimum for warm-up procedure must be adopted if allowance is to be made for possible clutch engagement. The reactor pressure limit may be increased by the provision of either manual or automatic special engine setting, such as altered ignition or valve timing, special carburation, alteration of compression ratio, etc., during the cold start procedure. Once the maximum allowable pressure in the reactor has been reached, the gas exit closure member may either (a) wholly open to release pressure and bring the system to normal running, (b) part open to maintain the pressure, allowing gases to leave the reactor at approximately the same rate as on entry, (c) remain closed while a second closure member wholly or partly opens to relieve or maintain pressure and conduct exhaust gases through a passage other than the normal exhaust system. This alternative is discussed more fully hereinafter. Alternative (b) allows the cold start procedure effectively to continue, since the maintenance of reactor volume pressure ensures that the gases spend longer in their passage through the chamber than under normal running conditions, this lengthening of passage time enabling the gases better to transfer heat to the colder reactor surfaces and to remain in a reacting environment for a more extended period to compensate for colder temperatures, so enabling the anti-pollution reactions substantially to take place. In a similar manner, alternative (c) also allows the cold start procedure to be maintained. In the preferred embodiment the first closure member is fully opened when the desired operational temperature is reached. The resultant pressure drop as normal gas flow rates commence will normally cause an initial surge in engine idling revolutions, giving the operator an audible indication that the engine is ready for work, and the clutch may be engaged.

The invention can be embodied in forms to meet the most stringent emission requirements, and perhaps meet them by wide margins. Considered as a catalytic reactor, it can be incorporated in highly effective embodiments. Considered solely as a thermal reactor, it can be embodied to function at least as effectively. The provisions for cold start place the invention at an advantage over competitive systems, mostly emitting a high rate of pollutants during cold running, and taking significantly longer to warm up than the present assembly. A further factor contributing to the effectiveness of the invention is the fact that its volume may be relatively larger than other systems fitted to an equivalent engine or vehicle. This is because the basic form of the invention involves the incorporation into the reaction volume of space not normally considered usable, that is the space in other systems between stub manifolds and between the connecting manifold or reactor and engine/cylinder block. With basically unidirectional gas flows, an increase in reactor volume retains the gases for longer in the reaction environment, thereby improving the degree of pollutant removal. Because the invention is effective in four separate respects, it offers capacity to produce pollutant levels well below required levels under normal running and cold start conditions. Because the emission requirements in many countries are based on cumulative measurements, that is totals over a spectrum of time and/or operating conditions, this normally below average performance means that it is of less importance if, under certain infrequent conditions or modes of operation, a temporary excess of pollutants is produced. The temporary excess is easily lost in total emission levels which are generally well below requirements. This characteristic is especially useful in reactors operating in the tricomponent mode, which is sensitive to too great mixture-ratio variations.

Materials and methods of manufacture are described in detail hereinafter. It is felt that the invention should be mass producible at a cost very much lower than other systems. The housing can be manufactured to last the life of the vehicle, as can the filamentary core if it is of ceramic material, including glass. If of metal such as nickel/chrome alloy, the core could be expected to last a minimum 25,000 miles, being easily and cheaply replaceable.

The above is meant to constitute a simple, easily understandable description of the basic features, principles and advantages of the invention, as it may be embodied to be fitted to any internal combustion engine and is intended to be understandable by persons not normally engaged in the art of exhaust emission control. It is hoped it has been shown that the invention overcomes to a significant degree various difficulties encountered in the art, such problem areas including the questions of cost, fuel economy penalties, use with engines of optimum efficiency, in-vehicle space, provision of extra air and exhaust gas recirculation, cold start, reaction-inducing power, adaptability to differing regulations, durability, adaptability to vehicles already in use, and to existing vehicle manufacturing techniques. Because so many of the long outstanding problems of the industry can be overcome by the disclosed means, it is considered that eventually most practical emission control devices will be along the lines of the present invention.

PORT AREA CONFIGURATION

This section deals mainly with exhaust port embodiments. How the invention affects inlet port considerations is described subsequently. It is intended that the features described herein may be used in any convenient combinations.

As has been noted, the basic embodiment involves the placing of an open-sided chamber against the engine or cylinder block, so eliminating the conventional exhaust manifold. In effect, the block therewith forms part of the reactor housing, and as such may play as important a role in the reduction of pollutants as the portions of the reactor assembly so far described, namely the applied housing and the filamentary material. It has been shown how the housing fits directly onto the block, whether or not this has other features, such as port liners or filamentary spirals. In alternative embodiments an intermember may be applied between block and reactor housing proper, this intermember either wholly or partly completing the definition of reactor volume. Where a section ceases to be an intermember and becomes an appendage to the block is not strictly definable, but in general an intermember is considered making contact with the periphery of the housing. The various features described, whether in relation to intermembers or attachments to the block, are intended to be applicable to both, and also where suitable to the periphery of the housing.

The arrangement of the reactor assembly in the manner described affects an art not strictly the subject of the present invention, namely that of exhaust gas flow. This art has for long been associated almost exclusively with the movement of columns or pistons of gas, and in particular with the kinetic energy and pulsing effects which are built up in the regularly dimensioned columns of gas. The present invention dispenses entirely with regular tubular configurations in the exhaust system's initial and most important section, with the result that the exhaust gases will flow in a manner previously little explored. Initial research has indicated that the gas flows of the invention present possible benefits. Firstly, the relatively great increase in cross-sectional area of the reaction volume over the total cross-sectional area of the exhaust ports ensures a considerable decrease in the velocity of the gases. The reduced velocity will greatly lengthen the durability factor of at least parts of the reactor assembly, since much wear is caused by the abrasive effect of the fast moving gases and their particulate content. Secondly, the gases from each cylinder meet and merge in the reactor volume, eliminating exhaust pipe branching. Branching is one of the problem areas of conventional exhaust flow art, since it is here that considerable power losses often occur. It is possible by careful design of branches to eliminate much power loss, but usually only within an optimum flow range. When engine speed varies above or below this, power losses increase. Thirdly the reaction volume will, to a valuable degree, absorb vibration, and, as has been mentioned earlier, also sound. Conventional exhaust pipes, with their regular, tubular configuration and metallic construction, may transmit and be the cause of, usually through magnification, of much vibration in their own right. The vibrations originating with engine combustion and carried by the exhaust gases will tend to become dissipated by the large volume of gas and filamentary material in the reactor. Although it is useful to place the reactor over a conventional exhaust port exit with its cylindrical shape, it is felt that the sudden transformation of the gas from a columnar configuration to the amorphous flows of the reactor volume, plus the sharp edge of the junction between port and block will together contribute to an unnecessarily inefficient gas flow and consequent power loss. For this reason, in a preferred embodiment the exhaust port bells out, that is progressively increases its diameter in some manner, and has been so shown in the sections of FIGS. 3 and 5. This has the beneficial effect of decelerating the rate of gas flow progressively.

In FIG. 6 is shown diagramatically a housing 51 enclosing a reaction volume 52, both having interposed between them and engine block 53 with exhaust port 54 an intermember 55 of substantially flat configuration. FIG. 7 shows a similar arrangement, but with the intermember 55 in association on one side with both engine block 53 and an exhaust port liner 56, which in the embodiment illustrated is restrained in position by the intermember 55. FIG. 8 shows a similar arrangement to that of FIG. 6 but with the substantially flat intermember 55 recessed into a corresponding depression 59 in the engine block 53, being restrained against the block in the embodiment shown by the enclosing housing 51.

In FIG. 9 is shown an arrangement similar to that of FIG. 6 but where the intermember 58 is of enclosing configuration, that is when viewed in elevation from the reaction volume side it is seen to have a depression 59 defined by a peripheral lip 60, the outline of which corresponds with that of the lip 61 of the enclosing housing 51. A notional plane drawn across the lips will define two sections of the working volume of the reactor, one within the housing at 62, the other within the depression 59, of the intermember. FIG. 10 shows a broadly similar arrangement, but where the mounting between housing and intermember is used to support filamentary material 63. FIG. 11 shows an arrangement similar to that of FIG. 9 but where the enclosing intermember 64 has an integral projection 65 on its engine side, in this embodiment of approximately ring or hollow cone like configuration, to act as exhaust port lining. FIG. 12 illustrates the fixing detail at (A) in FIG. 6, where an L clamp 66 and bolt 67 press the housing 51 to interplate 55 and thence to engine block 53. Compressible heat resistant material 68 is interposed between the joints to allow for proper sealing, possible differential expansion of the various components and more even load distribution between possibly marginally mismatched surfaces. FIG. 13 is a detail at (B) of FIG. 8 showing a similar fixing technique, and an alternative embodiment where the interplate 55 retains in position an exhaust port liner 56. FIG. 14 shows a fixing detail similar to that at (C) in FIG. 9 but retaining a different type of intermember 69, one which does not substantially mask the engine block, but which is part of an effective division of the enclosing housing, the advantages of which are explained below. Here the two portions are shown separately fixed to the block, although in some embodiments only the outer housing need be fixed, depending on detail design. By example, the housing 51 is retained against the intermember 69, by means of strapping band 70 pivotally attached to winged extensions 71 of a collar 72 mounted on unthreaded portion 73 of a stepped diameter stud 74, by means of nut 75 and washer 76 shown dotted. The intermember 69 is fixed to the block 53 by means of the same stud 74, an L clamp 66 and a washer 77 and nut 78 of larger internal diameter than the set 75, 76. Compressible heat resistant sealing material 68 is disposed within the joints between mating surfaces.

The provision of an intermember may have at least three principle advantages. Most importantly, it offers an opportunity to prevent heat loss from the reaction volume to the metal engine block and its associated cooling system, since the intermember can be made of insulating materials such as ceramic, similar to those of the main housing. Secondly, the additional and more conveniently disposed joints between various pieces may be used also to act as supports for additional matter, such as the filamentary material 63 between intermember and housing in FIG. 10 and between intermember 55 and block 53 in FIG. 7. Thirdly, the intermember offers the opportunity of splitting a reaction volume housing whose internal (or external) surface describes a curve of more than 180 degrees in cross-section, so that the portions may be manufactured on a male (or female) mould, a possibly cheap and structurally desirable way of producing the housings. It can be seen, for example that the reactor of FIG. 10 might not be manufactured by moulding if it were of integral construction in cross-section. Although in each case only one intermember has been illustrated, a plurality of intermembers may be used in association with one enclosing housing, or multiple intermembers may be combined to form such a housing.

FIGS. 15 and 16 show diagramatically by way of examples sectional plan views of reactor housings 79 mounted over the exhaust ports 54 of an engine block 53, where depressions 80 have been formed in volume usually occupied by the engine block assembly, the space gained by the depression becoming an integral part of the reaction volume 52. In FIG. 15 there is a continous depression and in FIG. 16 a series of depressions have been formed about provisions for twinned inlet ports at 81. Apart from the two above examples, space normally occupied by engine may be given over to the reaction volume in any configuration. It is generally desirable to have reaction volumes as large as possible for purposes of exhaust emission treatment, the limiting factors often being lack of underhood space in vehicles and the cost of providing greater and stronger reactor housings. In the case of the present invention, reaction volumes may be increased without any sacrifice of underhood space or increase of housing size and cost, by the procedure of "hollowing" into the engine block. The degree to which this will be possible will depend on such factors as whether an engine is especially designed to accommodate the invention or not. If so, it will have been possible to greatly reduce the water jackets (if water cooled) in the area, especially if insulating exhaust liners are incorporated, since it is desirable in the case of the invention to as far as practicable eliminate heat loss in the exhaust area and liners will obviate the need for cooling. Hollowing into the engine block is a means to allow more progressively shaped reaction volumes and more efficient and smooth gas flows to be achieved.

FIG. 17 shows by way of example a diagramatic sectional plan view of a reactor housing 79 mounted on an engine block 53, having exhaust ports 54 whose axes 82 are not parallel to one another and/or not perpendicular to the block face, whilst FIG. 18 shows a similar arrangement in vertical cross-section. It is important that the exhaust gases distribute themselves as evenly as possible within the chamber 50, that the factor of time, multiplied by the area of surface exposed is as equal as possible for the gases from differing ports, and that such wear and/or loading caused by abrasion, corrosion and gas velocity is as evenly distributed within the reactor as possible. This optimum equalling out effect may be achieved amongst other means, by angling the flow from each port in the most suitable directions, which will often involve port axis layouts along the lines of the example described by FIGS. 17 and 18. In this preferred embodiment the end port axes are furthest angled from the perpendicular to engine axis in plan view and the central port axes furthest from the perpendicular in vertical cross-sectional view, which will enable the gases to more readily travel the same distance to the reactor gas exit. Below is mentioned an alternative or complimentary means of better distributing gas flow.

It has been seen in the basic embodiment, described above, that filamentary material may be introduced in the exhaust port area, both to assist in the process of reaction and/or to properly direct the flow of exhaust gases. The control of gas flow may be achieved by providing members of substantially vaned, honeycombed or flanged configuration within the port, such members being manufactured of any suitable material such as metal or ceramic, but according to current technology are preferably made of metals having catalytic effect such as nickel/chrome alloy if the gas flow directors are desired to significantly assist in the reaction process. The particular embodiments of filamentary material suitable for exhaust port areas, with their relatively restricted cross-sectional areas and high gas flow rates (compared to those of the reaction chamber itself), are those where the material does not have significantly great cross-sectional area, which would cause obstruction to and acceleration of gas flow past the material. However, any configuration of filamentary material may be employed subsequently the port area, including the various embodiments described in especially if it is intended to utilize the material to assist in the reaction process.

By way of example, there is shown, in FIG. 19 in cross-sectional view and in FIG. 20 in front elevational view as seen from E, an exhaust port liner combined with honeycomb configuration gas flow direction 83, 85 and, held in position against engine block 53 by intermember 55, there being heat resistant compressible material 68 between the joints. Inside the port 54, the greater mass of gas will be concentrated toward the outside of the curve at 84, and therefore the honeycomb structure has at the end facing the gases a diagonal face across the port as shown, so that whatever frontal area the honeycomb vanes 85 have will cause the gases by deflection to pass through the structure more evenly distributed. With progression of gas flow the vanes become more mutually further spaced, so reducing gas velocity, and curve away from each other, so that the mouths 86 of the structure will direct the gases in a multiplicity of directions. The honeycomb structure may be of any suitable cross-sectional configuration, including by way of example, that of FIG. 21, where the passages have six faces, or that of FIG. 22, where the passages are formed by the intersection of radial and co-axial membranes. In an alternative embodiment, gas flow is directed by flanged members running part of the length of the exhaust port, as shown, by way of example, in an embodiment illustrated in sectional plan view FIG. 23 and in partial cross-section in FIG. 24. The flanged members are alternatively 'Y' shaped configuration at 87 and of roughly cruciform configuration at 88 and are spaced and held from each other by spacer risings 89 disposed at intervals along the length of the assembly. The flanged assembly of the illustrated embodiment is retained by fitment into grooves 90 in the port surround 91, such grooves optionally containing a compressible bed 92 as at F, in FIG. 23 and are held against block 53 by intermember 55 sandwiching the bent extention of flanges as at 93 through compressible material 68.

It may be desired to impart a rotating motion or swirl to the exhaust gases during their passage through the ports, so as to assist in the proper mixing of gases within the reactor volume. To this end, successive ports may have alternating directions of swirl, as indicated diagramatically in FIG. 25. The swirl may be imparted by vaned members disposed diagonally across the axis of gas flow. The vanes may be placed anywhere within the port area but in a preferred embodiment illustrated diagramatically in FIG. 26, the vanes 94 project from and are integral with the exhaust port wall or lining 95. If it is desired to introduce some turbulence as well as swirl to the gases, the individual vanes may be of waving configuration, as shown by way of example elevationally in FIG. 27 and in FIG. 28 in a sectional plan view through G of FIG. 27.

All the features described herein, may be combined in any convenient or desired way. By way of example, FIG. 29 shows a preferred embodiment in cross-section. The reaction volume is enclosed by an intermember 55 of ceramic material having projections comprising exhaust port liners 56 and spaced from engine block by compressible heat resistant material 68 such as ceramic wool, together with an enclosing housing 51 of integral ceramic construction. The joint between the two principle enclosing members supports a filamentary space frame 96 that is a construction of short straight metal rods connected to each other at different angles, which substantially fills the foremost part of the reaction volume, the rearmost portion of which is occupied by filamentary material of wool-like configuration of say a ceramic based compound. Within the exhaust port area are two metal cone shaped spirals 97 the free ends at their cemented back to back meeting projecting to from bayonet fixings shown dotted at 98, which locate in grooves 99 running from initial entry away from the direction of the exhaust valve, so that the pressure of gas flow will cause the spring projections or bayonets to seat at the end of the grooves.

Throughout this disclose the expression "engine block" is meant to denote what is known as either an engine block or a cylinder head block in conventional motor usage.

FILAMENTARY MATERIAL

This section deals almost exclusively with the alternative forms of filamentary matter, its material composition being described subsequently. Filamentary material was defined as portions of interconnected material which allows the passage of gases therethrough and induces turbulence and mixing by changing the directions of travel of portions of gas relative to each other. By interconnected is meant not only integral or continuous, but also intermeshing or interfitting whilst not necessarily touching. The above definition is applied to material within the reactor as a whole, not necessarily to the individual portions of that material. It is especially envisaged that in its most effective form the filamentary material in one reactor will consist of sections of varying composition. The three main classes of filamentary material may be said to comprise slab or sheet material, wire and wool, and are listed in order of progressively less resistance to abrasion and shock, provided of the same material. Therefore it is logical to place the more robust forms nearer the exhaust ports with the more fragile embodiments toward the rear of the reactor. If catalytic effect is desired, then the most suitable materials may be best incorporated in a particular form, this form being such that it is most suited to be placed in a particular portion of the reactor. It is possible that more than one catalyst is desired and these may be incorporated in positions most suitable to their differing forms. It has been noted that the main chemical reactions tend to take place in a certain sequence and, if special catalytic assistance is wanted for a particular reaction, that catalyst in combination with the most suited form of filamentary material may be placed in that area of the chamber where the reaction is most likely to occur. For example, if the reaction in question is expected to be the last to take place, then the appropriate catalyst/filamentary matter will be disposed in the rear half of the reactor, furthest from the exhaust ports. The definition of filamentary material, therefore, is meant to apply to that within the reactor as a whole, and not necessarily to each of the possibly many varied components that may make up one reactor filamentary assembly.

It is intended that the various embodiments of filamentary material described may be combined in any convenient manner within a single reactor assembly.

By way of example, an embodiment is shown cross-sectionally in FIG. 30 and in part sectional plan view in FIG. 31, wherein alternate slabs of honeycomb structure 101 and wool-like layers 102 make up at least the rear portion of a reactor 100. The path of a certain pocket of gas through the system is indicated in each view by the arrows 103. It will be noted that the honeycomb is not of conventional form, since it consists of passages with each stack or row of passages running in a different direction from the adjacent row. In the first honeycomb slab 104 the passages shown in section 106 run 'downwards' whilst the passage immediately behind, shown dotted at 107, are running 'upwards', with the separation of direction and therefore of gas flow taking place substantially in the vertical plane. The next honeycomb slab, 105 is of the same construction but placed turned through ninety degrees, so that the separation of gas flow is substantially in the horizontal plane. In this way the different portions of gas are properly intermixed, as can be shown by the path 103a, shown by dotted arrows, of a gas pocket starting adjacent to the first pocket and in its path through the assembly becoming widely separated from it. In other words, although an individual honeycomb passage does not induce turbulence, the disposition of passages relative to each other does so within one honeycomb structure, as may the provision of a succession of honeycomb configurations placed one behind one the other.

A form of filamentary material, not strictly wire or slab, which may be successfully employed in the invention is expanded metal or metal mesh. By way of example FIG. 32 shows in diagramatic sectional plan view how sheets of metal mesh formed into wave like configuration are placed one behind another inside a reactor 100, while FIG. 33 is a detail enlargement at H showing construction of the mesh. Mesh is usually formed by a combination of pressing and tearing sheet, processes which tend to leave sharp edges. Because materials are less resistant to heat, abrasion and corrosion when they are not smooth and rounded, the mesh used should preferably be subjected to sand-blasting or other smoothing process after forming. Metal mesh is a known product and could readily be manufactured of catalytically active metals. The particular forms described may also, because of their inherent suitability to the invention, be manufactured of non-metallic materials such as ceramic, possibly by alternative forming means.

Filamentary material in wool-like or fibrous configuration is especially advantageous in the invention because of its ratio of high surface area to mass and because it will more readily act as a particulate trap. Catalytic agents may be deposited on surfaces, for example by precipitation or deposition processes including those involving immersion in solutions or other fluids. If the material itself is to have catalytic effect, it will most readily be manufactured of metal, to which the considerations above will apply. That is, it should in the interest of durability be as smooth and rounded as possible, the wool preferably consisting of multiple fine regulation wire, woven, knitted, layered or randomly disposed. If the wool is composed of say fibres or strands of such materials as ceramic or glass, this will be more temperature, abrasion and corrosion resistant than metals, but will be more susceptible to 'flaking', that is particles or whiskers becoming detached from the general mass by the force of the gas flow, to perhaps lodge in a sensitive area downstream such as a valve. For this reason it is preferred that wools are placed in the sections of the reactor most suitable to them, in the case of metals rearwards away from the full heat and force of the gases, and in the case of ceramic fibres distanced from the gas exit. Alternatively and preferably, wools should be sandwiched or contained by other forms of filamentary material, for example as in FIG. 30.

Another appropriate form of filamentary material is wire, especially since in the case of metals it is almost always readily available in that form and need only be bent or otherwise formed to any desired shape. For reasons of durability, the wire deployed generally needs to be thicker nearer the exhaust gas source than elsewhere in the reactor. The wire may be woven 108 or knitted 109 into a mesh as illustrated diagramatically in elevational section in FIG. 34. It is preferable to devise a deployment of wire which avoids normal contact between strands, because the vibration of the internal combustion engine will tend to cause attrition at the points of connection, perhaps resulting in premature failure. Therefore the wire should preferably be arranged in forms to enable a relatively great length (i.e. surface area which is assisting reaction) to be incorporated in the overall restricted area of the housing with the various portions of wire having minimum contact. It is expected that some contact will take place between wires spaced close together but not touching, but this contact should preferably not be regular, although its occurance during freak vibration period or operating modes should not materially affect durability. An obviously suitable way of deploying the wire is in the form of spirals or coils, shown diagramatically in elevation disposed axially across the flow of gas in FIG. 35, and disposed co-axially with the flow of gas in FIG. 36. By way of example spirals having regular coils of equal diameter are shown at 110, while those having regular coils of progressively varying diameter are shown at 111, and spirals having irregular coils, that is of non-circular configuration and/or random diameter at 112. The three configurations comprise spirals having axes of substantially straight line configuration. FIG. 37 shows in diagramatic cross-section spirals 113 having curved axes, here arched to better withstand force of gas flow from direction 114. Any of the spiral types mentioned previously may have curved axes. The wire may also be disposed in two or three dimensional snake-like configuration. Such a two dimensional form is shown by way of example diagramatically in elevation in FIG. 38, whilst a three dimensional form is similarly shown in elevation in FIG. 39 and plan view in FIG. 40. Such forms may be disposed within a reactor in any number of ways, as for example shown in diagramatic sectional plan view in FIG. 41, where flat 'snakes' 115 and curved 'snakes' 116 (each snake comprising wire looped in the plane indicated) are stacked next to each other and behind each other, either spaced as at 117 or intermeshing as at 118. These stacks of loops or curves may also be randomly placed (not illustrated). FIG. 42 shows diagramatically how the plane of curves 119 may be straight, or as in FIG. 43, curved as at 120, to withstand gas flow from 114, or as in FIG. 44 curved as at 121 to provide a more ready and natural path for the gas flow. FIG. 45 shows in similar view how the planes of snake-like loops or curves, whether curved as shown or straight, may themselves intermesh past each other in any one or more dimensions, where the planes in solid line 122 are in the foreground and planes shown in dotted line 123 in the background. FIG. 46 shows in diagramatic sectional elevation how the planes of curves, as viewed head on, may intermesh in other ways, where 124 are planes shown solid in end elevation (here curved in a third dimension, although they may be straight) slanting across the path of planes behind shown dotted 125 running in other directions. Alternatively, their curvature in the third dimension may be non-coincidental, as shown at 126, whilst at 127 is shown how the curves in the third dimension allow for the close stacking of these planes. Conveniently, the planes span the shorter dimensions as shown, but they may also span the longer dimension. Alternatively wire may simply be disposed in strands across the reactor, as shown by way of example in diagramatic elevation in FIG. 47, where wires in the foreground are shown solid 128 and those behind dotted at 129. To assist in the elimination of sympathetic vibration, the various strands may be not quite parallel that is at a slight angle to one another (not illustrated). Generally, because the strands of the latter configurations may be arranged to be in tension; they need be of thinner configuration than the largely self-supporting structures such as spirals or snake-like loops. Wherever wire is herein described it is meant to comprise either a single strand, or multiple strands, as for example in diagramatic section FIG. 48. Because the material preferably exposes the maximum surface to the flowing gases, it may be desired to separate the individual strands of the wires to allow gas to flow through and past each strand, but to simultaneously still allow the separate strands to, a degree, support each other. Conventional separators may be employed, e.g. of ceramic, but in another embodiment the individual wire is crimped, that is minutely and closely bent in all directions, as shown elevationally in FIG. 49. As can be seen in cross-section FIG. 50 the wire effectively occupies a greater diameter, shown dotted, than its real thickness, resulting in the composite wire of FIG. 51. Fixings of wire and other filamentary material to reactor housing will be described later in this section.

The filamentary material may further comprise sheet or slab, and in a simple form may be described as a plane having some thickness, in the same way as did the series of snaked wire loops. These planes may be disposed within the reactor in much the same way as were those of the wire loops as described above. For example, the planes may comprise long sheets, straight or curved and be disposed illustrated diagramatically in FIGS. 41 to 46. Such sheets may further have a form of simple alternate wave as shown in diagramatic cross-section in FIG. 52, or a more complex waved or dimpled form as in FIG. 53. Alternatively, the sheet may have a sharply curved or crooked cross-section, as in FIG. 54 say to present a greater frontal area to gas flow 114. The sheet may further be in the form of holed fins or vanes as in cross-sectional FIG. 55, preferably having a thicker, more rounded section towards the side facing the gas flow 114. The holes in the sheet may have pressed projecting lip or lips, as shown in FIGS. 56 and 57, or the holes may comprise apertures formed by puching, pressing and/or tearing, without significant removal of material, as shown for instance in cross-sectional view in FIGS. 58 and 59. FIG. 60 showing a part elevation of such a sheet, illustrates diagramatically examples of forms of holes or pressed/torn apertures. Again, preferably sharp edges are removed after forming by blasting or other means. The sheet or slab may be formed into three dimensional interlocking or intermeshing forms, as shown by way of example in sectional elevation FIG. 61, where 130 describes a series of interlocking rings and 131 a series of interlocking hexagons. FIGS. 62 is a diagramatic cross-section showing by way of example a pattern of interlocking here using conical rings 132. FIG. 63 similarly shows interlocking means, but here the overall form is curved rather than linear. FIG. 64 shows in diagramatic cross-section how individual sheets 133 interlock to make up a three dimensional form, while FIG. 65 similarly shows the employment to this end of curved sheets 134.

The filamentary material may be fitted to the housing in a number of ways. Considering FIGS. 66 and 67, both sheet or slab 139 and wire 136 whether part of looped or spiral forms, or as in FIG. 36, wires 135 acting as structure supports may lodge in recesses 137 in the housing 138 as in detail section FIG. 66, or may be gripped by protrusions 140 as shown in detail section FIG. 67 and plan FIG. 68. Compressible material 141 may be interposed between filamentary matter and housing to prevent attrition through vibration. Alternatively, sectional plan FIG. 69 and elevation FIG. 70 shows how sheet 139 may be connected by linking members 142 which in turn affix to housing 138 along the lines illustrated in FIGS. 66 and 67. However, if the sheet is of suitable material such as ceramic it may be incorporated into the housing during the manufacturing process of the latter. By way of example, sectional plan FIG. 71 and elevation FIG. 72 show how slab 139 having appropriate, preferably holed, linking members 142 is integrated with housing 138 by means of the shrinking during formation of the housing in still malleable form upon the pre-formed prior-positioned interlinked slab assembly. Such a technique is considered especially viable where both filamentary material and housing are to be formed of ceramic.

The filamentary material may further be of the random or regular forms resulting in certain manufacturing processes involving what can roughly be described as fluid collision, possibly in association with reduction techniques. This will be more fully described subsequently. A further form of filamentary material has already been alluded to in the previous section, and that is the space frame, a construction formed of short, usually straight, mutually interconnected rods.

The filamentary material may further be in the form of pellets, preferably in spherical form, or occupying a theoretically spherical form. Pellets are known in the art, comprising small regularly surfaced globes. In alternative embodiments the pellets may be of irregular semi-ovaloid form as in FIG. 125, or of roughly kidney or bean-like configuration as in FIG. 126. However, it is preferred, so that most advantageous ratio of surface area to mass may be obtained, that the pellet comprises a form consisting of a series of projections and depressions, this form most conveniently having an overall sperical aspect, and configured so that preferably the projection of one pellet may not too easily fit into the depression of another pellet. If such interfitment is kept to minimum, it will ensure that the pellets are not tightly against one another, and so ensure a proper easy gas flow about and between the pellets. FIG. 127 shows four spaced projections in sectional elevation by way of example such a form, having three equally spaced projections 390 radiating from a central core of roughly mushroom or bulb like configuration. (Forms similar to this are used in concrete blocks for breakwater construction). The same principles might be applied to a pellet having a greater number of projections as shown diagramatically in FIG. 128, or having a multiplicity of projecting vanes, preferably disposed at angles to one another to better space adjacent pellets from one another, as shown in FIG. 129. In FIG. 129a the pellet may consist in a sphere having substantial snake-like depressions of rounded cross-section disposed in its surface. An embodiment similar to that of FIG. 127 is shown in FIG. 130, where the projections 391 are of more pronounced mushrooming shape. Such pellet like material will assume its most possibly compacted form under vibration, rather than when being fitted. To ensure that the pellets remain, after initial settlement, in a basically constant physical relationship to each other (rather than excessively move about and so wear more rapidly) the pellets are best subjected to some continuous pressure. This can for example be achieved by mounting pellets between filamentary material of wool and/or wire configuration. For example in cross-section FIG. 131 a housing 392 encloses pellets 393 adjacent to wool 394, in turn adjacent to wire 395.

The filamentary material may further have an ablative effect, that is its decomposition may be desired and controlled, in this case to contribute therewith to the desired reaction process. A material may be used resulting in the filamentary matter having a deliberately limited lifespan and providing within the reactor a compound which will react with the pollutants and/or gases under certain conditions.

COLD START AND RELATED FEATURES

It is proposed in this section to deal more fully with the various aspects of the cold start procedure, including the sequences and activating means of the valves, the possible ways the closure period may be prolonged without consideration of interference with engine settings, different forms of valve construction and lastly a brief mention of how valve configuration may have unconventional embodiments including those used for gas recirculation.

It has been seen in section one that, for the cold start operation to be effective the gas exit valve must be closed for as long a period as possible, the so far limiting factor being the amount of pressure attainable in the reactor without stalling the engine. In some cases, when the reactor has exceptionally rapid warm up characteristics it will not be difficult to keep the valve closed until the threshold of operating temperature range is reached. With other systems it will be more difficult, if not impossible. In such cases, it may not be advantageous to part open the gas exit thereby maintaining the pressure, since the gases emerging will only be partly de-polluted. As an optional alternative therefore, it is proposed that there be fitted to the reactor a passage communicating with an exhaust gas reservoir, and that there, optionally, be a second independent closure means between reactor and reservoir, preferably near the junction of passage and reactor. In operation, when the acceptable level of pressure in the reactor is reached (including a pressure no greater than atmospheric), the gases pass through the passage, either because there is no obstruction or because the obstruction to the reservoir has been removed. Once reactor warm up temperature is attained the flow of exhaust gas to reservoir would substantially cease. The gases are then expelled from the reservoir by any means, but preferably during the operation of the car while warm, either to the engine intake system and be recirculated through the combustion process, or to the reactor which being warm would satisfactorily process them. Because the gases are always continually reacting, however slowly, it is likely that they would become significantly pollutant-free during their sojourn in passages and reservoir. The period of this sojourn is likely to be many times greater, perhaps more than a hundred fold, than the duration of gas passage through the reactor during normal operation.

By way of example, FIG. 73 shows in diagramatic sectional elevation, the engine compartment 152 of a motor vehicle 153 fitted with the reactor 151 of the invention to which is coupled an expansible exhaust gas reservoir 150. FIG. 74 comprises a frontal sectional elevation, wherein the left half shows the reservoir expanded and filled with exhaust gas and the right half the reservoir reduced and relatively empty. With and over the reactor 151 is incorporated an inlet manifold 154 surmounted by a carburettor 155. A fan 156 draws air through the radiator 157. The reservoir 150 comprises a folding bellows member 158 mounted on a base 159, the bellows having at the end opposite the base (the lower end) an integral T-shaped stiffening member 160 which communicates at each end rigidly by means of triangulation members 161 to a slidable guide 162 mounted on a vertical rail 163. The bottom of each guide communicates with a compression spring 164 in turn communicating with the lower part of the vehicle structure 165. From a junction 167 upstream of the main reactor gas exit valve 166 a passage 168 communicates with the reservoir base 159 and from this base a second passage 169 in turn communicates with inlet manifold 154. The reservoir is in the position shown so that in normal use, that is when retracted and empty, it occupies a relatively protected position.

In operation, after the main valve 167 has closed, exhaust gas will travel down the passage 168 to fill the reservoir 150. A build up of pressure will be cause because the reservoir can only expand against the force of springs 164. The communication between the reservoir and inlet manifold being unobstructed, the gas will escape into the manifold at a rate in proportion to the size of opening and pressure in the reservoir. When the reservoir reaches a point near to limit of its downward expansion (allowance being made for safety margins) the main valve 166 opens, either partly to maintain pressure if full operating temperature has not been reached, or fully. In the embodiment the aperture between passage 169 and inlet manifold is made very small so that, even under the maximum designed pressure of the exhaust reservoir system, the rate of gas flow into the manifold is very low in proportion to flow produced through the exhaust ports, thereby giving a very reduced rate of exhaust gas recirculation. After the reservoir has been filled and gases diverted down the normal exhaust system, the loading of the springs 164 will ensure the slow collapse of the bellows 158 and the continued bleeding of gas into the inlet system until the reservoir has been emptied.

During the warm up period for the engine—longer than that for the reactor—the reservoir is acting as a radiator blind, reducing the degree of radiator screening with progressive collapse of reservoir, which matches the increasing warm-up of engine system. In usages where wide ambient temperature ranges are found, the size of aperture to inlet may be selected by engine operator, so that for instance in cold winter conditions, the degree of gas recirculation may be reduced by selection of smaller opening to give effectively a longer radiator screening period. The provision of a second valve communicating with passage 168 may in some configurations be omitted by the provision of a relatively small opening between reactor and passage at junction 167, the opening being of many times smaller cross-sectional area than the main exhaust pipe 170. The smallness of opening will restrict gas flow from reactor during the initial stages of warm-up and main valve 166 closure, until the higher pressure in the reactor accelerates the rate of gas flow along passage 168 to more rapidly fill up the reservoir. The non-closure of the small opening at 167 will ensure that the exhaust gases will effectively be recirculated to the reactor once normal warm operation commences. Depending on the strength of reservoir springs 164, the gas flow rates back through the opening will be lower than those into the reservoir, since the pumping action of the engine must necessarily have considerable greater force than spring action. If it is considered that the gases diverted to the reservoir system have not sufficiently reacted by the time they re-enter the reactor, then catalytic material may be associated with the reservoir, or its internally facing components and/or those of passage 168, 169, or they may be fabricated of a material having catalytic action, such as copper or nickel. Alternatively or additionally, junction 167 may be placed as closely as possible to the exhaust ports, so that the returning gases travel through a substantial portion of the now warm and fully operative reactor. The reservoir assembly may be made of any suitable materials, which to a degree will need to be heat tolerant. If the chosen materials have low heat tolerance, then optional heat dispersal means may be affixed to passage or pipe 168, as shown diagramatically at 171. If materials are heat resistant, as for example would be a bellows assembly made in silicone rubber, then insulating means may be incorporated on the passages, as shown diagramatically at 172, with the advantage that the gases may be maintained in the reservoir at warmer temperatures, thereby speeding up reaction processes. The warmth of the gases may be used to advantage in another configuration, where the gases are recirculated to the intake system above or at the carburettor. The provision of this flow of warm gas during cold start—as has been shown above, it may be operative to a degree already from a few cycles after firing commences—will assist in vaporisation of fuel during engine warm up. In a preferred embodiment, the gas is recirculated directly through the choke or cold start system of the carburettor. In normal usage, the gases will not at inlet entry point be hot enough to present risk of premature fuel combustion. Optionally a valve may be provided between reservoir and inlet system to regulate recirculation.

The valve construction presents possible problems, since it needs to be tolerant of the very high temperatures and abrasive qualities of exhaust gas, preferably for the full life of the engine. A range of suitable high temperature materials, including ceramics or nickel alloys, are described in more detail hereinafter. It is here proposed to described, by way of example, certain methods of valve construction which entail easy service in the event of need for replacement or maintenance, and which are capable of providing proper sealing, optional diversion of gases to storage or recirculation and some tolerance of particles or whiskers from any filamentary material. The principal feature of the major embodiments herein described is that the joint or flange between two principal components coincides with the valve axis, enabling valve and spindle to be manufactured as an integral unit and fitted when the two components are mated up, this configuration being particularly suited to butterfly valves. Alternative butterfly valve constructions involve the fitting of valve through say a slot in the spindle and location by screws when it has been positioned by passing through integral apertures, as for example in carburettor construction, and it is felt that such alternatives are too delicate or susceptible to expansion problems to be ideal for exhaust gas usage. The coincidence of joint with valve centre also results in possible sealing benefits, as will be seen later.

FIG. 75 shows by way of example in diagramatic plan view a reactor component 180 having at its junction with exhaust pipe 181 the main gas exit valve 182, whilst FIG. 76 similarly shows a reactor component 181 having between exhaust pipe 181 and main valve 182 an intermediate section 183 having at its junction with passage 184 communicating with recirculation system an optional secondary valve 185. FIGS. 77 to 81 show details of the valve 182 of FIG. 75, where FIG. 77 is a sectional view along K, FIG. 78 an enlarged plan view, FIG. 79 an elevation at L, FIGS. 80 and 81 details at the joint between sections. Manufactured integrally with spindle 186 and actuating lever 187a is a butterfly diaphragm 187 of biased oval configuration having one section 188 of greater surface area than the other 189, so that the valve will tend to fail safe in the open position. The cross section of the exhaust pipe 181 and reactor component near the joint is substantially of similar oval configuration to valve. Both major sections have their jointing and integral flanges 190, which are linked with coincident hollow load distributor ridges 191 through which pass the bolts 192, washers 193 and nuts 194 holding the two components together under compression, separated by compressible material 195 preferably in two separate layers passing each side of the spindle 186. This is shown in detail cross-section FIG. 81 through spindle at its passage between the two major components 180 and 181. Preferably the components and spindle should as shown have mating curves of non-coincident centres when assembled, so as to provide a stronger pinching effect in the area of joint 196 where the seal can be expected to be weakest. The slight internal projection of the twin layered compressible material 195, as shown in part section FIG. 80, will assist in the proper location and sealing effect of the diaphragm 187 when in the closed position. FIG. 82 shows by way of example a diagramatic sectional plan of the arrangement of FIG. 76, where the optional secondary valve is in the form of a pressure sensitive plug 197 and compression spring 198 assembly, and where a honeycomb structure 199 is located by the junction of intermediate section 183 to reactor 180, in order to act substantially as a fibre or strand trap. FIG. 83 shows a similar detail elevational plan view, wherein the passage 184 is joined to intermediate member 183 by at least two assemblies comprising two coincident hollow load-distributor ridges 191 and bolts 192, washers 193 and nuts 194, whilst the exhaust pipe 181 is connected to reactor 180 through the intermediate section 183 by means of assemblies 200 comprising three coincident load distributor ridges and associated fasteners. FIG. 84 shows diagramatically in longitudinal cross-section a hollow ball valve in the open position fitted in the joint between two components, where 201 comprises the 'ball' with its integral spindle 202 and actuating lever 203, with 204 the main exhaust passage, 205 the seals, 206 an optional secondary passage allowing exhaust recirculation means during cold start, 180 the reactor housing and 181 the exhaust pipe, with the joint between the two shown dotted at 207. FIG. 85 shows in similar sectional plan view the above arrangement with the valve in the closed position, allowing the secondary passage 206 to communicate into the main passage 204, which in turn communicates with an aperture 208 leading to exhaust gas recirculation means.

It is desirable to make the valve actuating means as simple and as fail-safe as possible. To this end, the valve should be spring loaded (not locked by mechanical action) in the closed position in such a way that reactor pressure over the designed limit will overcome the force of the spring sufficiently to allow some gas to escape, thereby again lowering pressure to below that required to actuate the spring and maintaining a balance of loading to keep the valve slightly open, to sustain constant pressure in the reactor. Such an arrangement is illustrated by example diagramatically in FIG. 86, where 210 shows a valve actuating lever in heavy line, butterfly valve 211 and internal face of passage 212 in light line, spring 213, spring axis 214 and spring anchorage 215 on housing and anchorage 216 on lever, with pivotal valve axis at 217. The valve assembly is shown in slightly open position on dotted line and fully open in chain dotted line. The same system of loadings may be employed and the valve actuated by making the previously fixed spring anchorage point 215 movable as in the path indicated by dashed line 218 between extremities 219 and 220, dashed line 214 indicating spring axes at each extremity. This movement of spring anchorage may be actuated in any way, and in a preferred embodiment is moved by a member driven by the expansion of heat sensitive material, such as a trapped pocket of gas or wax as shown in FIG. 87, where a piston 221 communicates with a container of high conductivity 222 exposed to the passage of hot exhaust gas 223 through a volume 224 of trapped readily expansible material such as gas or wax. The piston 221 is connected to rod 225 and linkage 226.

FIG. 88 shows schematically how the piston rod 225 actuates the operation of the valve by means of its actuating lever 210, spring 213, and an intermediate lever 227 mounted on pivot 228. The actuation of the valve indirectly, by means of a spring, ensures that fail-safe characteristics are embodied. If this is not considered necessary, then the heat actuated piston 221 may by direct linkage open and close the valve, as for instance if the end 229 of intermediate lever 227 were connected directly to the valve actuating arm (embodiment not illustrated). In both cases, but especially in the latter, it will be possible closely to relate valve opening to exhaust temperature, and therefore reactor pressure in relation to temperature.

It has been shown that the warm up the assembly has been hastened by the whole or partial closing of the exhaust gas exit by valves, in effect damming the gases inside the reactor. Such damming may be achieved by any suitable means including, in a preferred embodiment, the provision of a fan or turbine in the exhaust system adjacent to the reactor gas exit. Because the fan is inert on cold start and constitutes a barrier or dam in the system, pressure would build up behind it during the early cycles of engine operation. The fan preferably would not constitute a total barrier, some air passing either between the blades or their junction with housing, enabling the engine to be turned over on the starter motor with relative ease. Once firing commences, the rapid increase in engine speed and gas flow would ensure a considerable damming effect, which would only be relieved when the reactor pressure against fan blades overcomes the fan's inertia. Optionally the fan spindle and its bearing may have differential co-efficients of expansion so that when cold a tighter bearing fit would ensure greater resistance to rotation than when warm.

The above features may be used in any suitable combination with each other and also, where appropriate to fulfil functions not related to cold start. Gas circulation to inlet system may be associated with a gas reservoir, or alternatively it may be direct, that is eliminating the reservoir. Further, the exhaust gas recirculation (EGR) system described previously could for example be used after warm up had been achieved to provide EGR to the engine under normal running, either continuously or under certain operating modes. To facilitate the use of EGR and so thereby possibly to eliminate the use of pumps, a scoop may be placed in the reactor about the junction with recirculation passage, as illustrated diagramatically in FIG. 89, where the scoop 230 projects into the exhaust gas flow 231 so creating a higher pressure area at 232, which assists the flow of gas along the EGR system 233. Preferably, the scoop is placed in a 'weak' area of the reactor, that is where the reactions are taking place at below average rates, so that the least pollutant free gases are recirculated, permitting the reactions partly to continue during their second passage through the reactor. The scoop arrangement would entail that EGR employed continuously is in roughly constant proportion, after a build up of proportion between very low and medium speeds, since gas circulated depends on speed and therefore volume of gas issuing from the engine. Generally EGR absorbs engine power, but at certain lower rates and/or operating conditions EGR may marginally increase engine power. For this reason, and/or better to eliminate pollutants, it may be desired to have EGR operative under only specific running conditions, such as acceleration or deceleration, etc., An optional valve at junction of EGR system to intake manifold would, by way of example shown in diagramatic section FIG. 90, be intake vacuum operative, where 234 is the exhaust supply passage, 233 the EGR system, 235 the manifold, 236 a plug shown in open position against pressure provided by curved leaf spring 237, but which when closed seals passage 238 provided with progressively sized vent 239 operative when plug is wholly or partly in open position. The plug cap when closed seals against seats 240, where internal volume at 241 is pressure balanced with EGR system by weep passage 242. The degree of EGR in proportion to inlet vacuum (caused by say acceleration if placed before carburettor valve or by say deceleration if placed between carburettor and inlet port) will be regulated by the sizing of vent 239, which may be of linear, logarithmic or other progressively increasing dimension. The adoption of an operating mode may involve the need for a sudden supply of recirculated gas. With a direct system, once the initial demand has been met, a partial vacuum will be created in the EGR system, thereby slowing down rate of gas supply to below that ideally required. This may largely be obviated by incorporating an exhaust gas reservoir into the system, which may or may not be expansible. If an expansible reservoir, such as may be used in the cold start procedure is incorporated, then its expansible action may be progressively spring loaded. During normal running, recirculation pressures, say assisted by damming, are in the low range causing the first soft section of the springing to allow the reservoir to expand and contract within a range of say one quarter of its full expansion, this reservoir movement ensuring more consistent EGR rates at the sudden introduction of certain operating modes. During cold start the greater pressures will overcome the resistance of the second stronger section of the springing (as well as the first stage) allowing the reservoir to expand to its maximum capacity.

It has been said that EGR may under certain conditions contribute to marginal increases in power. In fact it is almost impossible for this to be achieved directly; any power gains are caused by the reduction of octane number requirement that EGR results in, thereby permitting increased compression ratios and more optimum valve and ignition timing for a given fuel. Because EGR assists in the prevention of predetonation or "knock", it is usually required especially at high load conditions. Previous systems have been proportioned to inlet vacuum, which is not necessarily very great under all high load situations. At least a portion of the EGR system, preferably under low pressure perhaps maintained by a reservoir, may therefore be connected directly to an enriching circuit in a carburettor only operative under high load conditions. Alternatively, an inlet gas velocity actuated valve, as shown in section plan FIG. 91 and elevation FIG. 92, may be incorporated at the junction of EGR system to inlet manifold. The valve, shown open in FIG. 91, comprises a shaft 243 slidable in a passage 244 communicating with EGR system, exposing a progressively sized vent 245, said shaft terminating in a head 246 having attached to it scoops or vanes 247 projecting into the gas stream 248 against the action of looped leaf spring 249. FIG. 92 shows the same arrangement with the valve which is accommodated in a housing 250 projecting clear of inlet manifold wall 251 in the closed position. Preferably a properly balanced EGR system will comprise a series of valves, say actuated by vacuum and/or velocity or other means, disposed in different parts of the inlet system and all communicating with the EGR system, preferably having a gas reservoir. By careful positioning of these valves, regulation of their spring bias to closed and selection of passage diameter, the right amount of EGR could be provided for the various driving modes. In or without association with such a valve system, part of EGR may be passed through certain fuel evaporation circuits, including those described later in this disclosure. The above system of valving and supply, described in connection with the supply of EGR, may also be employed to provide extra air to the inlet system, so as to assist in the provision of a precisely controlled air/fuel mixture ratio, especially desirable in the case of tricomponent exhaust emission system. The air may be supplied from a reservoir which has been fed through the air cleaner, as shown diagramatically in FIG. 93, where a co-axial chamber 252 surrounds the main inlet pipe and is adjacent the air cleaner 253, it being supplied with air through openings 254 having optional dams or scoop 255 to maintain air in the reservoir under low pressure. The same system of valves actuated by engine modes could be used to supply recirculated exhaust gas or air to the reactor by means of a passage leading from source to reactor via valve positioned say in air inlet system. The operation of such a valve is shown schematically in FIG. 94, where a shaft 256 and head 257 in the inlet system 258 open against spring 259 loading to free passage 260. It is preferred that there is incorporated in any EGR system a filter to trap particulate matter in the exhaust, this matter having been known to lead to increased engine wear and likelihood of mechanical failure in many previous improperly filtered systems. It is felt that with the invention, substantial air supply to the reactor will not be necessary. However, it may be desirable to supply small quantities of air, preferably by means described above, only under certain running conditions to assist in the accurate balancing out of any tricomponent process. The air reservoir may be expansible, say by the provision of elastometic sides, to provide air under more constant pressure with sudden change of operating mode.

REACTION PROCESS

The health and environmental effects of substances emitted by industrial and automotive exhausts have been extensively researched during the last fifteen years and a great deal of literature exists on the subject. It is known that the primary pollutants of internal combustion engine exhaust gas are carbon monoxide, hydrocarbons, oxides of nitrogen and particulates. These substances are nearly all harmful or undesirable in their own right (carbon monoxide being extremely poisonous) and also combine in the atmosphere in greatly complex reactions with themselves or other substances to form further undesirable substances, part of this process being loosely described under the heading formation of photochemical smog, since the secondary reactions (in the atmosphere) are often activated by sunlight. An outline of the formation of smog and its relationship to pollutants is contained for example by Prof. James N. Pitts Jr. and Gerald E. Grimstone in a paper to the ISAP 1972 Conference in Tokyo. Some idea of the scale of the problem may be judged by the figures for the tons of pollutants per day emitted in the Los Angeles area alone (with percentage attributable to automotive sources in brackets). Hydrocarbons 2,465 tons (65%); Carbon Monoxide 9,105 tons (98%); Oxides of Nitrogen 1,050 tons (72%); particulates 130 tons (42%). It is felt the subject need not be discussed here because of the comprehensive work of others and its only peripheral relevance to the invention.

The basic principles of the reaction processes of the three main gaseous pollutants when using the tricomponent method of approach, plus the basic principles of particulate treatment, have been described under section three, with some additional disclosure in sections five and six. It has been noted that the invention is intended to operate with any desired catalyst and to be adaptable to process the exhaust gas of any internal combustion engine. Where applicable, the principles of the invention may also be applied to exhaust gases from any other source of combustion, including an external combustion engine, such as the Stirling engine or the Rankine cycle engine, or to certain types of industrial combustion processes. Concerning I.C. engine exhaust gases, the subject matter of their formation in the combustion chamber has been thoroughly researched for over half a century (by Sir Harry R. Ricardo, amongst others). The question of exhaust gas interreaction and reaction under conditions of heat or catalytic action has over the preceding decade been the subject of the most major concentrated research the world has yet seen, with thousands of millions of dollars spent annually worldwide, and fruits of this activity have been set out in innumerable papers, reports by government agencies, journalistic articles, patent specifications, etc., It is felt that the science of exhaust gas reactions is also too well documented to be described here. A further reason for the omission is that the invention may apply to any I.C. engine including rotary, two-stroke and compression ignition, whilst chemical analysis must confine itself to a very particular specification and type of engine, fuel, material composition and ambient temperature of reactor and/or catalyst associated with it. It is known that the complex chemical reactions differ greatly with variation of these parameters, whilst perhaps still obeying the basic principles of the tricomponent approach described, or the principles of other basic approaches such as passage of gas through a sequence of alternate oxidising and reducing reactors (for example, the Questor system). Occasionally the sequence of the first two of the basic reactions described in section three is transposed, leaving HC to reduce NOx, depending on catalyst used. Mention should perhaps be made of an undesirable secondary reaction which has been causing some concern amongst environmentalists. In certain systems employing first a strong catalytic reduction reactor and an oxidisation reactor, ammonia has been formed with certain of the catalyst compositions employed. The nitrogen has reacted with the hydrogen present in the exhaust to produce ammonia: $2NO + 5H_2 = 2NH_3 + 2H_2O$. If the oxidisation catalyst is downstream the ammonia is oxidised back to nitric oxide, so making the process of pollutant removal self-defeating. The formation of ammonia takes place only with rich fuel mixtures and/or where extra air is supplied (in other words, in an oxygen rich atmosphere) and usually only in the presence of certain catalysts. In the case of the present invention it is extremely unlikely that ammonia will be formed, for the reactor is intended to operate in the stoichiometric fuel/air mixture range normally without extra air. Similar considerations apply to the reformation of NOx.

As may be seen, the invention does not primarily relate to chemical reactions but rather to the provision of a more suitable environment for those reactions to take place in. For that reason it is proposed to describe in this section means of affecting or controlling reactions to a desired level, rather than the reactions themselves. The principal known reaction controlling means nearly all involve—the provision of air or oxygen to reactor being an exception, the regulation or adjustment of the reaction taking place in the engine combustion volume, for example by variation of ignition or valve timing, the provision of EGR, the alteration of carburettor calibration, the enriching or weakening of the fuel mixture, etc., Such methods are all known and they and their effects on exhaust gas composition are fully documented.

It is proposed to provide an additional or alternative means for the regulation of engine combustion process, by allowing for the provision of two separate substances to the charge of ingoing gas, such as air. The first substance is the fuel, whilst the second substance may be a second fuel, a non-combustible or the latter mixed with fuel. The introduction of a second substance, continuously or otherwise, could measurably contribute towards engine power and/or improved exhaust emission and/or fuel economy. This latter aspect is relevant (it also relates directly to the first consideration) because of the 'crises' concerning, reduced availability of fossil fuels such as petroleum. The second substance may be introduced under, and assist in the effectiveness of certain running conditions such as sharp acceleration, high load or maximum power output. At such operating modes fuel consumption is greatly increased, but if the main fuel could be maintained at normal flow and the increased needs met by a second substance which is obtainable from non-fossil fuel sources, then a considerable saving of the main fuel is likely. Desirable as alternatives are, it is most probable that for many years to come the prime power of automative units will be supplied by oil products. The second substance employed may be another fuel, such as alcohol or methanol which may be manufactured from such substances as waste paper, or it may be water in the form of liquid, vapour or gas, known since the turn of the century to give improved performance under certain conditions, and tends to have an anti-knock effect, or in a preferred embodiment may consist of a mixture of the two.

The introduction of a second substance will affect the composition of the exhaust gases and emission control reactions. Water is nearly always present in excess quantity in exhaust gases, so the introduction of more water will not drastically affect reaction processes, although it can significantly reduce nitric oxides by cooling, if the water is introduced as liquid and absorbs latent heat in its conversion to steam in the high ambient temperature of the combustion volume. This cooling effect can be overcome if the water is introduced as steam. At very high temperatures water (and also products of combustions such as carbon dioxide and nitric oxides) tends to dissociate, producing $H_2$ and $O_2$. This dissociation involves the absorption of heat (which may be compensated for by the provision of heat in steam) which is not necessarily returned as cooling takes place and some $H_2$ and $O_2$ reforms to water. The provision of extra oxygen and hydrogen separately in the exhaust gas can in certain embodiments be of assistance in the reduction of pollutants, such as oxides of nitrogen. Concerning methanol, it can sometimes produce more power for a given volume than petroleum, due to its improved evaporation, but it might encourage knock and is preferably mixed with water. Water introduced as a liquid in the cylinder expanding to steam, or steam introduced under pressure, may greatly improve the volumetric efficiency of an engine. It is felt that the benefits of the multiple substance supply to charge will increase in practice in proportion to combustion temperatures. It will be borne in mind that the invention is adaptable to all I.C. engines, including those likely to be developed in the future. Below are disclosed means for the introduction of two substances possibly simultaneously to an engine charge. In alternative embodiments more than two separate substances may be introduced. In addition to methanol, any other suitable hydrocarbon, for example ethanol, may be mixed with water. The introduction of water may be related to atmospheric humidity and regulated by a sensor.

The following describes means of introducing substances to an intake charge which do not involve the vaporisation of fuel by gas velocity. Any of these means may be employed for the introduction of both the secondary substance and/or the main fuel to the charge. Additionally the secondary substance may be fed to a separated section of a carburettor processing the main fuel, this separated section only becoming operative under certain driving modes. The two substances may be gravity fed to intake area by separate reservoirs, or they may be fed from a combined reservoir, such as the float chamber illustrated schematically in cross-section in FIG. 95, where a standard type float 261 moving vertically on spindle 262 to actuate shutoff lever 263 is positioned within a housing 264 containing volume for substance one, the housing 264 being concentric within outer housing 265 defining volume containing substance two and forming a barrier between the substances. The outer volume contain a hollow cylindrically shaped float chamber 266 slidably mounted on guides 267 to activate shutoff lever 268, fuel connections, shutoff valves, lid design and sealing all being according to conventional usage. A single, multiple-liquid containing float chamber assembly may be subdivided in any way, including by example the embodiment shown schematically in section in FIG. 96, where one circular float chamber 269 and one crescent shaped float chamber 270 are mounted in separate volumes each on spindles 271. The multiple substances reservoirs have been shown of circular cross-section in alternative embodiments, but may be of any suitable cross-section, including oval or rectangular, and of any shape elevationally.

In the case of compression ignition engines or other engines having cylinder or port primary fuel injection, the other substances may be supplied by means of additional injectors or any of the means described and alluded to above, or they may be introduced by compound injectors, that is by different passage systems in the same injector. The injection may be linked, that is injection of one substance will automatically cause the introduction of another, or the systems may operate independently of one another. FIG. 97 shows by way of example a diagramatic section where the primary fuel 272 is injected in the normal way at 273 by the lifting of nozzle 274 having a hollow central passage 275 linking with a secondary fuel gallery at 276 only when nozzle lift and consequently normal fuel injection is taking place. The secondary fuel is under continuous pressure and will therefore inject at 277 only when nozzle lift occurs. The proportion of normal to secondary fuel is determined by their respective pressures and the duration of degree of overlap between gallery and hollow passage. FIG. 98 shows diagramatically a compound injector having an inner nozzle 278 coaxial and within the outer 279, operating in the conventional mode with independent lift and injection capacity. This has the possible disadvantage of the long fuel travel down the hollow passage of the central nozzle. By way of example, a design involving a shorter central nozzle fuel travel from pressure resevoir to tip is shown schematically in cross-section in FIG. 99 and in plan in FIG. 99a where the nozzle assembly is viewed from the combustion volume. The central nozzle 280 operates in the conventional manner, moving vertically on its axis in the release of fuel, whilst the outer nozzle 281 moves coaxially on the first and in its seating in a rotational mode during the release of fuel. The rotational movement is imparted against the resistance of friction seals 282 be means of jets 283 terminating tangentally to diameter of nozzle, so imparting to it a twisting motion due to the force, and for the duration of fuel injection. This will result in a slinging of fuel across the combustion volume in the manner indicated at 284, in a similar manner to the action of some garden hoses. The injection of the outer nozzle is effected by means of a pressure wave in the coaxial and surrounding fuel chamber 285, which will depress one or more plungers 286 against spring 287 loading, and so by inward movement mate up fuel galleries to make connection and allow for fuel travel between the chamber 285 and jet 283 tip. The jet 283 has inappropriately been called such to distinguish it from nozzles proper as at 280 and 281. This slinging action imparted by rotational nozzle movement, the latter in turn imparted by the tangental direction of fuel spray, has considerable benefits over conventional injection systems. They operate in straight line distribution of fuel, whilst the snakelike shape formed by the spray of the invention is of greater length, thereby lessening the chance of liquid deposition or combustion in chamber walls before atomisation has taken place. The slinging action also tends to distribute the droplets of fuel through a greater volume of charge than the conventional uni-directional injection. The rotary injector has been described in a composite embodiment, but in an alternative embodiment the rotary principle may also be embodied in an injector handling a single fuel.

FORM OF HOUSING

Under this section it is proposed to describe various forms of housing wall construction, ways in which the reaction volume shape and association with engine block may be adapted to suit various types of engine configurations, how the housings may be subdivided into sections and how these sections may be affixed to each other, and ways in which the reactor housing may be associated with the inlet system and fuel supply of the engine.

Generally in the previous embodiments described the internal face of the reactor housing, that exposed to the exhaust gases, has been regular. This may have the disadvantage, according to the nature of filamentary material deployed within the reactor, of tending to define a path of lesser resistance to the gas flow 300, as shown diagramatically in FIG. 100, where 301 is the housing, 302 the engine block, 303 say filamentary wool and 304 the less obstructive section between wool and housing. This will result in too great a proportion of the gases travelling this path of lesser resistance rather than passing as intended fully through the filamentary material, with a result that some of the gases will not as fully interreact as the system allows for. In order to mitigate this usually undesirable effect, the interior face of the housing may incorporate a series of depressions and/or projections, designed to break up gas flow adjacent to housing face and to direct as much of the gas inwards towards the core of filamentary material proper. FIG. 101 shows in diagramatic elevation part of the inside face of a reactor housing, having a series of possibly alternative projections, with FIG. 102 a corresponding section. By way of example, at 305 are shown a series of spaced straight ridges, while at 306 are curved intermeshing ridges and at 308 interconnecting ridges. At 309 are shown dimples or nipples, while at 310 are irregular projections of star-like or cruciform configurations. FIG. 103 shows example of how filamentary material fixing means may break up gas flow, with 311 a trench-like depression, 312 a projecting collar and 313 the ridges and troughs of earlier description. The internal face of the housing may further be waved as shown in diagramatic part elevation in FIG. 104 and in part section in FIG. 105 showing a similar configuration where the waves are not continuous but form a succession of dune-like shapes. Both waves and dunes may be of regular cross-sectional configuration, as at 314 or may have a shallow slope facing the oncoming exhaust gases 300, and a sharp slope on the leeward side of the gas as at 315, or vice versa. In FIG. 106 is shown how a ridge 316, optionally acting as filamentary retaining means, directs the flow of gas away from the junction between housing 301 and filamentary core 317, say of honeycomb configuration. Since the housing comprises at least partly insulating material, there will be a large temperature drop between the inside face of the housing assembly and its outside face. Because of the high internal temperature of the reactor, perhaps in the 1100° to 1200° C. range, the temperature drop may not be sufficient to result in a surface temperature sufficiently low to prevent accidental burning by operating or service personnel. Largely to obviate this danger, the surface of the housing may be provided with protective ridges as at 318 in FIG. 105 or nipples as at 319 in FIG. 106. There will be further temperature drop between surface proper and extremity of projection, but a much smaller hot surface is presented to accidental contact, thereby limiting heat absorption and degree of possible burning.

The reactor housing may be incorporated with all or part of the inlet system of the engine, as illustrated diagramatically by way of example in the case of a four cylinder engine in cross-section in FIG. 107 and in elevational cross-section FIG. 108 along component joint line 320, where 301 is the main reactor housing, 321 an inter-member reactor housing, 322 exhaust gas exit, 325 carburettor assembly, 323 inlet manifold and 324 the outline of the exhaust ports. The principles illustrated above may be applied to the integral reactor and inlet housing for any configuration of engine cylinder bank. For ease of manufacture, the reactor assembly of FIG. 107 has been made in two major components, which are fastened together in use in such a way as to facilitate the replacement of filamentary material. Jointing and division of components of this type, although not so shown, can be incorporated to the housing of any configuration, including those illustrated in this disclosure. They may be removably attached to each other in any manner, including the method of fasteners such as bolts placed in co-incident hollow load distributor ridges, as described hereinbefore. Alternatively, the joints may be effected by spaced or continuous arcuate form back to back 'L' members 326, as shown in part cross-section FIG. 109, where the 'L' members by means of interconnecting bolts 327, nuts 328 and washer plates 329, press the two components together, preferably at a joint having mating non-flat surfaces as at 330 to ensure proper location of components, separated by compressible material 331. In other embodiments, especially where the filamentary material is expected to last the life of the entire reactor assembly, it may be desirable to have the reactor fitted as a complete unit and remain effectively sealed, perhaps because the manufacturer wished to guarantee that factory settings were never tampered with. In such a case the various components of the reactor could be properly assembled and the jointing effected with a permanent adhesive or by a mastic jointing compound which would bond adjacent surfaces together after the assembly had been fired or heat or chemically treated.

In the case of V8 engines, costs may be saved and a better reaction environment created if both banks of the engine be made to discharge exhaust gases into a common central reactor 332, as illustrated in diagramatic cross-section in FIG. 110. With a central exhaust collection point in an engine fitted to say a motor vehicle, some difficulty may be experienced in conducting the gases away to rear of the vehicle, due to restrictions of under-bonnet space. In a preferred embodiment, the reactor has one or more twisting exits 333, as shown by example partly in FIG. 110 and in plan view FIG. 111, and longitudinal section FIG. 112 at M. The exhaust ports will not be too unequally spaced from one of the two gas exits, and the arrangement allows for twin exhaust pipe/muffling systems underneath the vehicle. The same twisting principle may be applied to a single exit from a reactor, with consequent reduction of valve and other duplications. In an alternative arrangement suited to 'V' configuration engines, especially long ones of four or more cylinders per bank, it may be more suitable to have an end exhaust gas exit. If it were a disadvantage that some gases were to spend longer in the reaction volume than others, then a longitudinal gas exit pipe 335 may be disposed within the reactor, as shown in diagramatic section FIG. 113. By the careful arrangement of the taper of conical form of the pipe, and the displacement of its entry holes 336, the equal travel of exhaust gases 300 from port through filamentary material 337 to exit pipe 335 could be assured. Such a pipe may also be used in reactors of other forms.

It is intended that in some embodiments the housing of the reactor and/or inlet assembly assists in the supply of fuel, or of more than one different type of fuel to an engine. One of the most suitable materials for the construction of housing is ceramic, having low thermal conductivity. By controlling the thickness of material between reactor and any inlet and/or fuel provision system, one may accurately determine the temperature of fuel and/or inlet gas in general or at a particular locality. This fact may be used to assist in the proper charging of the mixture in a number of ways, either during continuous use or under certain operating modes. One such method would be to provide for the vaporisation of fuel by heat, rather than air velocity. An example is schematically illustrated in FIG. 114, a cross-section part of a housing 339 incorporating two inlet manifolds 340 passing over the reaction volume 338. Between the manifolds and over the reaction volume, from which it is separated by a relatively thin wall 341, is a vaporisation chamber 342, gravity fed with liquid fuel by means of a passage 343 within the housing communicating with a reservoir 344. From the vaporisation chamber lead passages 345 to the manifold either directly or by means of multiple apertured hollow needle assemblies 346. In operation, the liquid fuel enters the vaporisation chamber where it evaporates or boils due to its contact with heated wall 341. Because of the confined volume of the chamber, vapour or gas will be discharged through passages 345 into the inlet charge. Sufficient fuel will enter into the chamber and vapour formed to build up pressure, the degree of which is determined by minimum cross-sectional area of passages 345. This pressure will result in the reduction of liquid fuel entry to point where just enough enters to replace vapour escape and so maintain the pressure at an equilibrium. This balanced state is dependent on the precise design of chamber volume, floor area and temperature, gravity or pressure of fuel feed, size of fuel entry area, passage size and configurations. Such a system could supply fuel at rates proportionate to inlet gas volume flow rates and operating mode, because it is under pressure and fuel vapour flow rates would sensitive to inlet vacuum. The effect of gas velocities could properly affect fuel flow rates, according to design of passage 345 and needles 346. In a preferred embodiment, illustrated in position in longitudinal section FIG. 114a and detail section FIG. 114b, the needle 345 would have a hollow core 347 containing fuel vapour or gas and communicating with inlet charge flow 348 by roughly perpendicular fine passages 349 along its length, and larger passages 350 in the area of its rounded streamlined head 351. In operation, such a needle will exude a fuel vapour in rough proportion to inlet vacuum through passages 349 and in rough proportion to gas velocity through passages 350. By careful design of the above and other features, proper mixture control can be achieved using heat vaporised fuel. The basic principles described can alternatively be used to provide and maintain at the right temperature other products to relate to, control or assist the engine combustion processes, such as for example steam or superheated steam. These principles may be employed to supply one or more different substances to one engine, simultaneously or otherwise, and are preferably embodied in materials of low thermal conductivity better to maintain temperature, and to control these at specific locations by degree of exposure to and distance from heat source. The above may all further apply to substances supplied to engines only under specific driving modes.

The inlet section of the housing assembly may have disposed within it wicks to wholly or partly provide fuel or other substances to the engine charge. By way of example FIG. 115 shows in cross-section and FIG. 116 in longitudinal section a tubular wick 352 inside and against the face of the inlet portion of the housing 353. Fuel, gravity or otherwise fed, fills depressions in the housing comprising a main supply channel 354 and secondary distribution channels or grooves 355. The wick preferably has a progressively varying diameter to ensure contact with a greater proportion of incoming air or gas, and may work on either or both of two principles, namely that either the fibres absorb and carry the fuel, or they define capilliary passages which transmit the fuel. If the former, the wick may have fibrous extension within or across the inlet, for instance in the form of gauze mesh. In general a wick will be sensitive to, and transmit fuel in proportion to, variations of vacuum or pressure. It is sometimes less suited to respond in the correct proportion to variations in gas velocity. Should the increase in fuel transmission with increase in velocity not be great enough, the wick may be arranged so that the fibres have a bias to lean toward the direction of gas flow 357, as shown at 358 in FIG. 117, when engine is inactive. As gas velocity starts and increases, it will progressively force the fibres against bias to a more perpendicular position, as shown at 359 in FIG. 118, thereby exposing more fibre surface, and therefore more fuel transmitting surface to the airflow. The inverse of the foregoing may alternatively be applied. The wick need not be of circular section, but as shown by way of example in FIG. 119, may have a segmented cross-section. Similarly it may be of greater length on the outer side of a curve, where the gas flows will be more intense and faster and so more effective, than on the inside as shown in FIG. 120 at 360. As indicated diagramatically in FIG. 121, a wick 361 may transmit fuel at separate localities, or may transmit different, substantially non-mixing fuels 362. Different wicks transmitting substantially non-mixing substances may be used in association with or adjacent to each other within a single engine system.

The reactor constitutes a single unit from the engine block to exhaust pipe proper, notwithstanding that its volume may be divided into sections having differing catalytic effect. The cold start procedure has been described as effectively damming the reactor exit. In the gas of reactors having relatively large volume, the cold start damming may take place within the reactor, dividing it, as shown schematically in cross-section FIG. 122, into a fore portion 364 and a rear portion 365 separated by dam 363.

MATERIALS AND MANUFACTURING METHODS

It is proposed to describe firstly those materials which are in general suitable for the high temperature and mechanical requirements of the invention, and then to describe materials particularly suitable to the filamentary matter in particular. Lastly various manufacturing methods will be described which are not especially well known or used as far as the inventor is aware, and which are considered especially suited to the production of the components of the invention. Material science is an immensely complex subject and has been rapidly expanding and developing during recent years, so for this reason it is proposed to give only an outline of the various material types and embodiments which may be used. The same considerations apply to a lesser extent to the question of manufacturing methods. Of course, the invention in any of its embodiments may be made of any suitable material, including those not mentioned here and those which will be devised, discovered or developed in the future.

The more suitable materials for general use fall into three catagories: metals, ceramics and glasses, and giant molecules generally known as polymers. Broadly, metals are ductile, resistant to thermal and mechanical shock, strong with progressive weakening with increase in temperature, tolerably resistant to abrasion and corrosion, in their refined and alloyed forms fairly resistant to temperature, and substantially in their elemental form. The other two catagories do not have the same broad spectrum of advantageous qualities; ceramics and glasses, which are generally oxides or compounds of the half-way elements, have superior qualities in all respects except ductility, resistance to shock and ease of working. However, because they are often very strong, more temperature resistant and generally much harder and abrasion/corrosion resistant than metals, great efforts have been made over the last decades to overcome their disadvantages. New manufacturing processes have been devised, the mixes have been blended to increase resistance to shock and means of reinforcement developed. Concerning the polymers, these do not yet have the resistance to wear and temperature, or the hardness and strength of the materials, but they are beginning to be used as reinforcements and are also very suitable as insulating materials. They are capable of being the most elastomeric of the three groups and are useful for the manufacture of say the exhaust reservoir bellows of the invention, where temperatures are not as high as in the reactor. Polymers are being developed continuously; they are man-made and almost never occur freely in nature, and it is suspected that new super materials will be developed in the future by the polymerization of such metals as aluminium (next to silicon on the atomic scale) and some of the ceramic oxides. Many compounds do not fit clearly into one of these catagories but lie in the area between.

The most suitable metals are the so called 'super alloys', alloys based on nickel, chrome and/or cobalt with the addition of hardening elements including titanium, aluminium and refractory metals such as tantalum, tungsten, niobium and molybdenum. These super alloys tend to form stable oxide films at temperatures of over 700° C., giving good corrosion protection at ambient temperatures of around 1100° C. Examples include the Nimonic and Inconel range of alloys, with melting temperatures in the 1300° to 1500° C. range. At colder temperatures of up to 900° C. certain special stainless steels may also be used. All may be reinforced with ceramic, carbon or metal fibres such as molybdenum, beryllium, tungsten or tungsten plated cobalt, optionally surface activated with palladium chloride. In addition and especially where oxidizing reinforcement is not properly protected by the matrix, the metal may be face hardened. Non metal fibres or whiskers (often fibres grown as single crystals) such as saphire-aluminium oxide, alumica, asbestos, graphite, boron or borides and other ceramics or glasses may also act as reinforcing materials, as can certain flexible ceramic fibres. Materials, including those used as filamentary matter, may be coated with ceramic by vapour deposition techniques.

Because of their greater hardness and higher temperature resistance, ceramics are the most suitable materials for situations where mechanical and thermal stock loadings are not critical. In the case of the invention, they are especially suited to the manufacture of the housings, intermembers and port linings because of their generally low thermal conductivity. Suitable material include ceramics such as alumina-silicate, magnesite, cordierite, olivine, fosterite, graphite, silicon nitride; glass ceramics including such as lithium aluminium silicate, cordierite glass ceramic, "shrunken" glasses such as borosilicate and composites such as sialones, refractory borides, boron carbide, boron silicide, boron intride etc. If thermal conductivity is desired, beryllium oxide and silcon carbide may be considered. These ceramics or glasses may be fibre or whisker reinforced with much the same materials as metals, including carbon fibre, boron fibre, with alumina fibres constituting a practical reinforcement, especially in a high-alumina matrix (the expansion coefficients are the same). In fact it is the very high alumina content ceramics which today might be considered overall the most suited and most available to be used in the invention generally. The ceramic or glass used in the invention generally may be surface hardened or treated in certain applications, as can metals and often using the same or similar materials, including the metal borides such as of titanium, zirconium and chromium, silicon, etc.

The filamentary material may be made of metals, preferably smoothed and rounded to avoid undue corrosion, or of ceramics or glasses. Other materials which might be particularly suitable once they are in full commercial production are boron filaments, either of pure boron or compounds or composites such as boron-silica, boron carbide, boron-tungsten, titanium diboride tungsten, etc. The material, especially if ceramic, may easily and conveniently be in the form of wool or fibres, and many ceramic wool or blanket types materials are today manufactured commercially, usually of alumina-silicate, and could readily be adapted to the invention. Such ceramic wool could also be used as a jointing material either alone or as a matrix for a more elastomeric material such as a polymer resin. The material may either be such to have catalytic effect, as in the case of many metals, or have a catalyst mounted or coated on the basic material, such as ceramic.

High temperature lubricants will be necessary for moving parts, and these may comprise boron nitride, graphite, silicone fluids and greases, molybdenum compounds, etc. For perhaps the less direct mechanical applications, polymers may be employed. Silicones have already been mentioned as being suitable in rubber form for the expansible bellows of the reservoir of the invention, and may also be used structurally in harder, resinous form. Resins suitable include those of the phenolic family (e.g. polytetrafluoroethelyne) and boron containing epoxy resins. Other polymers suitable are for example the boranes, such as decaborane, silicones containing un-carborane and other silicon-boron groups. These polymers may be reinforced with any whisker or fibre, including those mentioned above.

Wool, especially if of ceramic material, is often made by extruding or extracting fine jets of molten matter in a bath of cold fluid, usually liquid, a process which has been referred to previously as a fluid collision technique because of the force required and the rapid cooling on contact with the fluid. In a preferred embodiment hot liquid filamentary material is injected through fine apertures, possibly arranged in the disposement of exhaust port layouts, into a restricted volume containing cold fluid which is of corresponding shape to reactor housing, the liquid on cooling forming into a wool mass of generally the shape to fit into reactor housing. If the wool or fibres are too linear in configuration, then the cooling liquid may be agitated say in a twisting irregular motion preferably by means of impeller forcing fluid into the cooling reservoir through an aperture corresponding to the exhaust gas exit. In FIG. 123 is shown schematically such a layout, where the molten material 370 injected under pressure through small apertures 371 into a resevoir 372 containing cold fluid 373 agitated by propellors 374, the resultant fibres formed indicated at 375.

The complex shapes that the filamentary material may comprise may be manufactured by a reversal process, whereby the forms of the intended passages are made up in material A, about which the filamentary material B is formed. Subsequently material A is dissolved or leached out in a suitable substance such as acid or water, leaving the material B only in the intended form. Such methods are known and suited to ceramic manufacture.

The materials may be formed by any of the current techniques now known, including slip forming, molding, pressing, stamping, sintering, extruding etc. The isostatic pressing of powders is one of the more suitable means of manufacturing in ceramic the possibly complex shapes of the reactor housings, providing sufficient hydraulic pressure is available for the relatively large sizes of the objects. Pressing usually takes place on a male mandrel, which can accurately be made to the desired form. If the internal form entails difficulty of removal of product, then the male mandrel may be an elastomeric housing filled with an incompressible effectively fluid material such as liquid or powder or grains, these being removed after forming so that the mandrel may be collapsed inwardly. FIG. 124 shows schematically in cross-section such an arrangement, where 375 is the base plate, 376 the elastomeric collapsible male mandrel filled with fine sand 377, and surrounding fluid 378 under pressure exerts force via expansible outer membrane 379 on the powder 380 to form the desired product. In operation, the mandrel is filled with sand via closable passage 381, the compression membrane 379 is fitted over the base and powder injected into the volume between membrane and mandrel through closable passages 382, preferably under pressure to properly fill it. The assembly is then placed in fluid, which is subsequently subjected to violent pressure, causing the compression of powder by means of the flexible membrane 379. The pressure is sometimes effected by explosion or detonation. After pressing has taken place, the membrane is removed, the sand 377 inside the mandrel is is extracted, the mandrel 376 collapsed, say by application of vacuum through passage 381, and the pressed object removed. In many instances the external surface has to be machined to attain the right shape, sometimes because of inaccurate manufacture. The control of form of outer casing, and of proper even powder 380 dispersal before pressing can be improved in the following manner. The elastic outer membrane may have wall thickness deliberately varied at certain points, so that when powder filling under pressure and inevitable expansion takes place, the thinner (therefore less strong) sections expand further than the thicker thereby causing a corresponding projection in the object to be formed. By accurately controlling the rate of expansibility of different sections of outer membrane relative to each other, by means of variation of wall thickness, provision of stiffening ribs externally etc., and also the precise amount of powder and pressure under which supplied, a form can be pressed accurately, with neither face needing post machining. Just prior to pressing the filled assembly may be subjected to agitation or vibration, to ensure the uniform distribution of powder 380 at even pressure. The pressing technique has been described with inner forming member non compressible in operation but in an alternative the outer former may be non compressible, with the inner being the membrane adjacent to working fluid.

In conclusion it is to be emphasised that the various features and embodiments of the invention may be used in any appropriate combination or arrangement.

In the following recitation of claims, "filamentary material" shall be defined as portions of interconnected material which allow the passage of gases therethrough and induce turbulence and mixing by changing the directions of travel of portions of gas relative to one another, the interconnection being integral, continuous, intermeshing, interfitting or abutting, this definition applying to the material within the reactor as a whole and not to particular portions of it. By "ceramic" is meant ceramic in the widest sense, ecompassing materials such as glass, glass ceramic, shrunken or recrystalised glass or ceramic, etc., and shall refer to the base or matrix material, irrespective of whether other materials are present as addatives or reinforcement.

What I claim is:

1. An internal combustion engine comprising a cylinder block having an external face, said block having at least one exhaust port in said face and at least one intake port, and a housing which when fitted over said at least one exhaust port defines together with the face of said block an exhaust gas reaction volume and an exit, whereby gas proceeds directly from the exhaust port into and through the volume to said exit provided in the housing without reversal of direction, said housing in cross-section parallel to the face of said block being roughly elliptical.

2. The engine of claim 1, wherein the exhaust port has a progressively increasing diameter in the direction of said gas exit means.

3. The engine of claim 1, wherein the surface of said at least one exhaust port and the surface of the block defining the exhaust gas reaction volume are of insulating material.

4. The engine of claim 1, wherein said exhaust gas reaction volume contains filimentary material.

5. The engine of claim 1, including an intermember deployed between the housing and the engine block.

6. The engine of claim 1, wherein said housing has a gas flow restricting device of variable effect disposed at said exhaust gas exit means.

7. The engine of claim 1, wherein said housing contains at least one passage for intake air in operation communicating with said intake port.

8. The housing of claim 1, including fuel passages for heating fuel.

9. The housing of claim 1, wherein said housing is of ceramic material.

10. The housing of claim 1, wherein said housing is mounted against said engine block by tensile members.

11. The internal combustion engine of claim 1, wherein the block has a plurality of exhaust ports.

12. The internal combustion engine of claim 1, wherein said housing contains material which may impede the directional flow of said exhaust gases.

13. The internal combustion engine of claim 1, wherein the face of said block has depressions therein such that the plane of the junction between the housing and the block bisects said exhaust gas reaction volume.

14. An internal combustion engine exhaust gas reaction volume housing suitable for mounting directly against an engine block, said housing having a first aperture for gas exit and a second aperture for gas entry, said second aperture being larger than said first aperture, said second aperture defining a perimeter suitable for mounting against a portion of the surface of an engine block having at least two exhaust ports, in operation gases passing between the apertures without reversal of direction.

15. The housing of claim 14, wherein the cross-sectional area of the second aperture is of approximately similar magnitude to the mean cross-sectional area of the housing.

16. The housing of claim 14, wherein said housing comprises ceramic material.

17. The housing of claim 14, wherein a gas flow restriction device of variable effect is mounted in the region of said first aperture.

18. The housing of claim 14, having an interior surface wherein said interior surface and said engine block surface located within said perimeter of said second aperture of said housing when mounted together define said reaction volume.

19. The housing of claim 14, including an intermember mountable to said engine block and housing between said housing and said block.

20. The housing of claim 14, including filamentary material mounted within said housing, said material permitting at least part of said body of exhaust gas to travel from said port to said exit means without reversal of direction.

21. The housing of claim 14, wherein said housing is at least partly enclosed by a metallic casing.

22. The housing of claim 21, wherein said housing and said metallic casing are spaced by an interlayer of material.

23. The housing of claim 14 having an interior surface coated with a material having a catalytic effect.

24. The housing of claim 14, including an engine block to which said housing is mounted, and at least two exhaust ports in said block in operation discharging gas into said second aperture.

25. The housing of claim 24, wherein a portion of said surface of said block is not parallel to a plane linking the perimeter of said second aperture.

26. The housing of claim 24, including a lining of insulating material for said exhaust ports.

27. The housing of claim 24, wherein said exhaust ports have a progressively increasing cross-sectional area in the direction of the gas flow.

28. The housing of claim 24, including filamentary material located within said reaction volume.

29. The housing of claim 24, including filamentary material located within said exhaust ports.

30. The housing of claim 24, defining at least one passage for admission of charge gas to said engine block.

31. The housing of claim 24, defining at least one passage for admission of fuel to said engine block.

32. The housing of claim 24, wherein the axes of said ports are not co-directional.

33. A housing for enclosing a combustion engine exhaust gas reaction volume, said housing having single gas entry means and at least one gas exit means opposite said entry means, said housing mountable over at least one exhaust port set in an engine block surface, the cross-sectional area of said reaction volume at said entry means being substantially greater than the cross-sectional area of said port, so that in operation a substantial body of exhaust gas will, during travel from within said port to within said volume, decrease its forward velocity and increase its cross-sectional area, said body travelling from within said exhaust port to said exit means without reversal of direction, the interior surface of said housing at any cross-section taken at an angle to said block surface through a continuous surface of said housing resembling a bent line with two ends, said ends representing the perimeter of said entry means.

34. The housing of claim 33, having an interior surface wherein the interior surface of said housing and the portion of said surface of said block located within the perimeter of said entry means when mounted together define said reaction volume.

35. The housing of claim 33, including an intermember mountable to said engine block and housing between said housing and said engine block.

36. The housing of claim 35, wherein said intermember has a surface which together with said interior surface of said housing when mounted together define said reaction volume.

37. The housing of claim 33, including filamentary material mounted within said housing, said material permitting at least part of said body of exhaust gas to travel from said port to said exit means without reversal of direction.

38. The housing of claim 33, wherein said housing is of ceramic material.

39. The housing of claim 38, wherein said housing is at least partly enclosed by a metallic casing.

40. The housing of claim 39, wherein said housing and said metallic casing are spaced by an interlayer of material.

41. The housing of claim 33 having an interior surface coated with a material having a catalytic effect.

42. The housing of claim 33, including a gas flow restriction device of variable effect mounted in the region of said exit means.

43. The housing of claim 33, including an engine block to which said housing is mounted, said engine block having an exhaust port.

44. The housing of claim 43, wherein a portion of said surface of said block is not wholly parallel to a plane linking the perimeter of said entry means.

45. The housing of claim 43, including a lining of insulating material for said exhaust port.

46. The housing of claim 43, wherein said exhaust port has a progressively increasing cross-sectional area in the direction of the gas flow.

47. The housing of claim 43, including filamentary material located between said engine block and said housing.

48. The housing of claim 43, including filamentary material located within said exhaust port.

49. The housing of claim 43, defining at least one passage for admission of charge gas to said engine block.

50. The housing of claim 43, defining at least one passage for admission of fuel to said engine block.

51. An internal combustion engine having a block with a plurality of exhaust ports, an exhaust gas reaction volume housing having a first aperture for gas exit and a second aperture for gas entry, an intermember suitable for mounting between the perimeter of said second aperture and a surface of said block having said exhaust ports, the contact area between said intermember and said block having a single external perimeter.

52. The engine of claim 51, wherein said intermember comprises insulating material.

53. The engine of claim 51, wherein said intermember comprises ceramic material.

* * * * *

UNITED STATES PATENT AND TRADEMARK OFFICE
CERTIFICATE OF CORRECTION

PATENT NO.  : 5,031,401
DATED       : July 16, 1991
INVENTOR(S) : Mitja V. Hinderks It is certified that error appears in the above-identified patent and that said Letters Patent is hereby corrected as shown below:

Title page, [76] Inventor:
  change the inventor's address to read:

-- Mitja V. Hinderks, 1015 Gayley Avenue,
     No. 1228, Los Angeles, California 90024 --

Signed and Sealed this

Fifth Day of January, 1993

Attest:

DOUGLAS B. COMER

*Attesting Officer*   *Acting Commissioner of Patents and Trademarks*